US012114385B2

(12) United States Patent
Wu

(10) Patent No.: US 12,114,385 B2
(45) Date of Patent: Oct. 8, 2024

(54) COMMUNICATION OF SEGMENTED RADIO RESOURCE CONTROL MESSAGES

(71) Applicant: GOOGLE LLC, Mountain View, CA (US)

(72) Inventor: Chih-Hsiang Wu, Taoyuan (TW)

(73) Assignee: GOOGLE LLC, Mountain View, CA (US)

( * ) Notice: Subject to any disclaimer, the term of this patent is extended or adjusted under 35 U.S.C. 154(b) by 236 days.

(21) Appl. No.: 17/627,777

(22) PCT Filed: Jul. 9, 2020

(86) PCT No.: PCT/US2020/041334
§ 371 (c)(1),
(2) Date: Jan. 17, 2022

(87) PCT Pub. No.: WO2021/011285
PCT Pub. Date: Jan. 21, 2021

(65) Prior Publication Data
US 2022/0322141 A1    Oct. 6, 2022

Related U.S. Application Data

(60) Provisional application No. 62/882,923, filed on Aug. 5, 2019, provisional application No. 62/879,713, filed
(Continued)

(51) Int. Cl.
*H04W 76/18* (2018.01)
*H04L 5/00* (2006.01)
(Continued)

(52) U.S. Cl.
CPC .......... *H04W 76/18* (2018.02); *H04L 5/0048* (2013.01); *H04L 5/0053* (2013.01); *H04W 24/08* (2013.01);
(Continued)

(58) Field of Classification Search
CPC ... H04W 76/18; H04W 24/08; H04W 28/065; H04W 36/08; H04W 76/19; H04W 76/20;
(Continued)

(56) References Cited

U.S. PATENT DOCUMENTS 11,330,661 B2 *    5/2022  Kim ...................... H04L 69/166
2007/0291695 A1   12/2007  Sammour et al.
(Continued)

FOREIGN PATENT DOCUMENTS

KR    2020-0074725 A     6/2020
KR    2020-0128977 A    11/2020
WO    WO-2021012168 A1 *  1/2021  ............ H04W 28/06

OTHER PUBLICATIONS

International Search Report and Written Opinion for Application No. PCT/US2020/041334, dated Sep. 7, 2020.
(Continued)

*Primary Examiner* — Ayaz R Sheikh
*Assistant Examiner* — Tarell A Hampton
(74) *Attorney, Agent, or Firm* — MARSHALL, GERSTEIN & BORUN LLP

(57) ABSTRACT

A method for managing communication of a segmented RRC message that includes N segments is implemented in a first base station configured to communicate with a user device. The method includes receiving (222) a first M segments of the segmented RRC message from the user device (M<N), and determining (230), before receiving an (M+1-th) segment, that one or more criteria for initiating a handover to a second base station are satisfied. The method also includes, after determining that the criteria are satisfied, executing a first RRC procedure before a second RRC procedure has completed, where the first and second RRC procedures are different ones of (i) the first base station receiving (264 or 645) at least the (M+1)-th through N-th
(Continued)

segments of the segmented RRC message from the user device, and (ii) initiating (233, 332, 433, 532, 633 or 732) the handover to the second base station.

24 Claims, 15 Drawing Sheets

Related U.S. Application Data on Jul. 29, 2019, provisional application No. 62/875,041, filed on Jul. 17, 2019.

(51) Int. Cl.
| | |
|---|---|
| *H04W 24/08* | (2009.01) |
| *H04W 28/06* | (2009.01) |
| *H04W 36/08* | (2009.01) |
| *H04W 76/19* | (2018.01) |
| *H04W 76/20* | (2018.01) |
| *H04W 76/27* | (2018.01) |

(52) U.S. Cl.
CPC ......... *H04W 28/065* (2013.01); *H04W 36/08* (2013.01); *H04W 76/19* (2018.02); *H04W 76/20* (2018.02); *H04W 76/27* (2018.02)

(58) Field of Classification Search
CPC .... H04W 76/27; H04L 5/0048; H04L 5/0053; H04L 2001/0097; H04L 1/1635; H04L 5/0055
See application file for complete search history.

(56) References Cited

U.S. PATENT DOCUMENTS

| | | | |
|---|---|---|---|
| 2008/0287105 A1* | 11/2008 | Wu | H04W 12/037 455/412.1 |
| 2009/0103445 A1 | 4/2009 | Sammour et al. | |
| 2010/0034171 A1* | 2/2010 | Pelletier | H04W 36/0058 370/331 |
| 2011/0032889 A1* | 2/2011 | Lee | H04W 74/006 370/329 |
| 2012/0230219 A1 | 9/2012 | Pettersson et al. | |
| 2012/0300748 A1 | 11/2012 | Lindstrom et al. | |
| 2014/0056243 A1* | 2/2014 | Pelletier | H04W 52/365 370/329 |
| 2014/0293908 A1 | 10/2014 | Kumar et al. | |
| 2015/0289157 A1* | 10/2015 | Lundqvist | H04W 24/10 455/419 |
| 2016/0029275 A1* | 1/2016 | Guo | H04W 36/0055 455/436 |
| 2016/0135097 A1 | 5/2016 | Jinnu et al. | |
| 2016/0285592 A1* | 9/2016 | Hsu | H04L 1/189 |
| 2016/0285716 A1* | 9/2016 | Pelletier | H04L 43/0811 |
| 2017/0294977 A1 | 10/2017 | Uchino et al. | |
| 2018/0123739 A1 | 5/2018 | Yi et al. | |
| 2018/0317137 A1 | 11/2018 | Loehr et al. | |
| 2018/0324617 A1* | 11/2018 | Schmidt | H04W 24/08 |
| 2019/0053113 A1 | 2/2019 | Wu | |
| 2019/0104432 A1* | 4/2019 | Dhanapal | H04W 76/50 |
| 2019/0150217 A1 | 5/2019 | Kim | |
| 2019/0200212 A1 | 6/2019 | Quan et al. | |
| 2019/0289661 A1* | 9/2019 | Chen | H04W 24/10 |
| 2019/0394807 A1* | 12/2019 | Xiao | H04W 72/56 |
| 2020/0107223 A1 | 4/2020 | Liu et al. | |
| 2020/0196376 A1 | 6/2020 | Kim et al. | |
| 2021/0153022 A1* | 5/2021 | Ohlsson | H04W 12/037 |
| 2021/0211865 A1* | 7/2021 | Li | H04L 69/04 |
| 2022/0191962 A1* | 6/2022 | Di Girolamo | H04L 5/0053 |
| 2022/0217583 A1* | 7/2022 | Jin | H04W 8/24 |

OTHER PUBLICATIONS

International Search Report and Written Opinion for Application No. PCT/US2020/041318, dated Sep. 9, 2020.
Huawei et al., "Segmentation of UE Radio Capability Information," 3GPP Draft (2018).
International Search Report and Written Opinion for Application No. PCT/US2020/041324, dated Sep. 23, 2020.
Samsung, "SRB Type for the Segmented UECapabilityInformation," 3GPP Draft (2019).
Apple, "Segmentation of UE Capability," 3GPP Draft (2019).
Huawei et al., "Signalling of Supportings Segmentation of UE Capability," 3GPP Draft (2019).
3GPP, "3rd Generation Partnership Project: Technical Specification Group Radio Access Network; NR and Evolved Universal Terrestrial Radio Access (E-UTRA); Study on Optimizations of UE Radio Capability Signalling: Release 16," (2019).
International Preliminary Report on Patentability for Application No. PCT/US2020/041324, dated Oct. 5, 2021.
International Preliminary Report on Patentability for Application No. PCT/US2020/041334, dated Oct. 5, 2021.
Office Action for European Application No. 20745457.0, dated Apr. 2, 2024.
3GPP TS 38.331 V15.5.1 (Apr. 2019), 3rd Generation Partnership Project; Technical Specification Group Radio Access Network; NR; Radio Resource Control (RRC) Protocol Specification (Release 15), 491 pages.
3GPP TR 37.873 V0.1.0 (2019-03), 3rd Generation Partnership Project; Technical Specification Group Radio Access Network; Study on Optimizations of UE Radio Capability Signalling; NR / Evolved Universal Terrestrial Radio Access Network (E-UTRAN) aspects (Release 16), 18 pages.
3GPP TS 38.300 V16.1.0 (2020-03), 3rd Generation Partnership Project; Technical Specification Group Radio Access Network; NR; NR and NG-RAN Overall Description; Stage 2 (Release 16), 133 pages.
3GPP TS 38.331 V15.6.0 (2019-06), 3rd Generation Partnership Project; Technical Specification Group Radio Access Network; NR; Radio Resource Control (RRC) Protocol (Release 15), 519 pages.
3GPP TSG-RAN2 Meeting#105, R2-1901292, Resubmission of R2-1817648, Athens Greece, Feb. 25-Mar. 1, 2019, "Segmentation of UE Radio Capability Information", 3 pages.
3GPP TSG-RAN2 Meeting#106, R2-1907570, Revision of R2-1904814, Reno Nevada, USA, May 13- 17, 2019, "Signalling of Supporting Segmentation of UE Capability", 3 pages.
3GPP TSG-RAN2 WG2 Meeting#106, R2-1907721, Reno, Nevada, USA, May 13-17, 2019, "SRB Type for the Segmentated UE Capability Information", 3 pages.

* cited by examiner

COMMUNICATION OF SEGMENTED RADIO RESOURCE CONTROL MESSAGES

FIELD OF THE DISCLOSURE

This disclosure relates to radio resource control messaging and, more particularly, to wireless communication systems that communicate radio resource control messages that are divided into multiple segments.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

In some wireless communication networks, user devices (commonly referred to using the acronym "UE" for "user equipment") can divide certain radio resource control (RRC) messages into multiple segments, and sequentially transmit those segments to a base station of a radio access network (RAN). According to one proposal for the 3rd Generation Partnership Project (3GPP) specification for fifth-generation (5G) radio access ("NR") networks, for example, a user device can divide an RRC protocol data unit (PDU) containing a UE capability information message (and thus, the message itself) into multiple segments, and sequentially transmit those segments to a base station via a radio link. The UE capability transfer procedure is described in more detail in 3GPP TS 38.331 v15.6.0.

In some instances, however, an intervening event might trigger another RRC procedure before the user device has transmitted all segments of the segmented RRC message. For example, handover criteria may become satisfied (triggering a handover procedure) while the user device is transmitting the message segments. This can cause various problems, depending on the system design (e.g., the configuration of the user device and/or base station). For example, the handover might cause an RRC procedure associated with the segmented RRC message to fail (e.g., a failed UE capability transfer procedure), the handover procedure itself might fail, and/or other related problems may arise (e.g., radio link failure or suboptimal system performance if a timely handover does not occur).

SUMMARY

Techniques of this disclosure concern wireless communication systems in which, while the user device is transmitting segments of an RRC message to a base station via a radio link for purposes of a first RRC procedure, the base station determines that one or more handover criteria is/are satisfied (e.g., if a signal quality metric falls below a threshold for the radio link). The disclosed techniques increase the probability that the user device and/or the base station will successfully complete both the RRC procedure associated with the segmented RRC message (e.g., a UE capability transfer procedure) and the handover procedure, and/or decrease the probability that delayed completion of one of those procedures will cause related problems (e.g., radio link failure or suboptimal system performance).

In one technique, when a first base station receives from the user device the first M segments of an RRC message that includes N segments (0<M<N), and subsequently determines that one or more handover criteria are satisfied, the first base station initiates a handover to a second base station before receiving the last N-M segments of the segmented RRC message from the user device. This technique may reduce the risk of radio link failure, by avoiding or reducing delay of the triggered handover (e.g., when the signal quality is poor). Moreover, if the user device is configured to handle handover-related procedures (e.g., processing a reconfiguration message from a base station) during transmission of the segmented RRC message, the user device and RAN can successfully complete the RRC procedure associated with the segmented RRC message (e.g., a UE capability transfer procedure) despite the interruption/handover. In an alternative technique, when the first base station receives the first M segments and subsequently determines that one or more handover criteria are satisfied, the first base station instead suspends the handover procedure, and waits to receive the last N-M segments from the user device before initiating the handover to the second base station. This latter technique may be preferred if the user device is not configured to handle handover-related procedures during transmission of the segmented RRC message. Moreover, if the delay is small, radio link failure due to poor signal quality may be unlikely.

In some implementations of the former technique (i.e., where the first base station does not suspend the handover), and in scenarios where the first and second base stations perform the handover without utilizing the core network (e.g., an "Xn" handover in 5G), the first base station sends/forwards the M segments received from the user device to the second base station. In other implementations and/or scenarios, where the core network assists in the handover (e.g., an "NG" handover in 5G), the first base station instead sends/forwards the M segments to a core network node, after which the core network node sends/forwards the M segments to the second base station. In either implementation/scenario, after the handover is complete, the second base station may request the remaining N-M segments from the user device in an RRC message. Thus, the second base station can receive all segments of the segmented RRC message, without the user device having to restart the transmission of all segments.

Alternatively, the second base station (i.e., the base station to which the user device is being handed over) may not receive any message segments from either the first (originating) base station, or from the core network. In this technique, after the handover is complete, the user device may restart transmission of the segments, beginning at the first segment and ending at the last (N-th) segment. Thus, the second base station can receive all segments of the segmented RRC message, without the first base station and/or the core network having to forward any segments to the second base station.

In another technique disclosed herein, the user device transmits only a single RRC message segment in response to each RRC message (e.g., request message) that the user device receives from the base station. Thus, to obtain all N segments of the segmented RRC message, the base station sequentially transmits N RRC messages to the user device. If the segmented RRC message is a UE capability information message, for example, the base station may transmit N UE capability enquiry messages to the user device. Thus, the base station has the flexibility to either immediately perform a handover triggered during communication of the segments (without having to concurrently receive and process any segments), or to instead suspend the handover until the base station requests and receives all segments. In this manner, the base station can avoid receiving a segment at a time when the base station is unable to process the segment, or at a time when the segment would otherwise disrupt the handover. More generally, this technique may enable the base station and/or user device to handle other types of RRC procedures (i.e., other than handovers) triggered during communication of RRC message segments (e.g., communication of a non-access stratum (NAS) message, measurement reporting, reconfiguration of the user device, etc.). In some implementations, the base station or user device decides whether to suspend the handover or other triggered RRC procedure based on the capabilities of the user device or base station, respectively. For example, the user device may inform the base station that the user device cannot receive and/or process any unrelated RRC messages (e.g., reconfiguration messages) while transmitting segments of a first RRC message (e.g., a user device capability information message), in which case the base station may request all of the message segments before sending the user device an unrelated RRC message.

One example implementation of these techniques is a method, in a first base station configured to communicate with a user device, for managing communication of a segmented RRC message that includes N segments. The method includes receiving a first M segments of the segmented RRC message from the user device, M being an integer greater than zero and less than N, and determining, by processing hardware of the first base station and before receiving an (M+1)-th segment of the segmented RRC message, that one or more criteria for initiating a handover to a second base station are satisfied. The method also includes, after determining that the criteria are satisfied, executing a first RRC procedure before a second RRC procedure has completed. The first RRC procedure and the second RRC procedure are different ones of (i) the first base station receiving at least the (M+1)-th segment through an N-th segment of the segmented RRC message from the user device, and (ii) initiating the handover to the second base station.

Another example implementation of these techniques is a method, in a first base station configured to communicate with a user device, for managing communication of a segmented RRC message that includes N segments. The method includes performing a handover procedure with a second base station that was previously communicating with the user device. Performing the handover procedure includes receiving a first M segments of the segmented RRC message from the second base station or a core network node, M being an integer greater than zero and less than N. The method also includes, after performing the handover procedure with the second base station, generating, by processing hardware of the first base station, an RRC message indicating that the first base station received the first M segments, and transmitting the RRC message to the user device to cause the user device to transmit a last N-M segments of the segmented RRC message to the first base station.

Another example implementation of these techniques is a method, in a core network node configured to communicate with a first base station and a second base station, for managing communication of a segmented RRC message that includes N segments. The method includes performing a handover procedure with the first base station and the second base station, at least in part by receiving from the first base station a first message including a first M segments of the segmented RRC message (M being an integer greater than zero and less than N), generating, by processing hardware of the core network node, a second message including the first M segments, and transmitting the second message to the second base station, to cause the second base station to request a last N-M segments of the segmented RRC message from the user device.

Another example implementation of these techniques is a method, in a user device configured to communicate with a first base station and a second base station, for managing communication of a segmented RRC message that includes N segments. The method includes transmitting a first M segments of the segmented RRC message to the first base station, M being an integer greater than zero and less than N. The method also includes, after transmitting the first M segments and before transmitting an (M+1)-th segment of the segmented RRC message, receiving from the second base station an RRC message indicating that the second base station received the first M segments. The method also includes, in response to the RRC message, transmitting a last N-M segments of the segmented RRC message to the second base station.

Another example implementation of these techniques is a method, in a user device configured to communicate with a base station, for managing communication of a segmented RRC message that includes N segments. The method includes receiving N RRC messages from the base station, generating, by processing hardware of the user device, the N segments, and for each segment of the N segments, transmitting the segment to the base station in response to receiving a different one of the N RRC messages.

Another example implementation of these techniques is a method, in a base station configured to communicate with a user device, for managing communication of a segmented RRC message that includes N segments. The method includes generating, by processing hardware of the base station, N RRC messages, and for each segment of the N segments, transmitting a respective one of the N RRC messages to the user device, and receiving the segment from the user device in response to transmitting the respective one of the N RRC messages.

DETAILED DESCRIPTION OF THE DRAWINGS

Generally speaking, the techniques of this disclosure allow a user device (UE) to successfully communicate all segments of a segmented RRC message to a RAN despite a handover being triggered during the multi-segment transmission, without retransmitting segments unnecessarily or causing failure of the handover, and/or without causing related problems (e.g., radio link failure or suboptimal system performance) due to delay of the handover. An additional technique of this disclosure provides similar advantages for the more general case in which an intervening event triggers an RRC procedure (e.g., a handover procedure, a measurement reporting procedure, a UE reconfiguration procedure, transmission of a NAS message, etc.)

during the multi-segment transmission. Each of these techniques is discussed below with example reference to a 5G radio access ("NW") network and a 5G core network (5GC). However, the techniques of this disclosure can apply to other radio access and/or core network technologies.

In this disclosure, any reference to different actions (e.g., receiving, transmitting, etc.) being performed by a "RAN" may indicate that the actions are all performed by a single base station of the RAN, or that the actions are performed by different base stations of the RAN, depending on the implementation and/or scenario. For example, a series of communications between a user device and a RAN may involve two different base stations if a handover occurs during the course of those communications.

Figure 1:
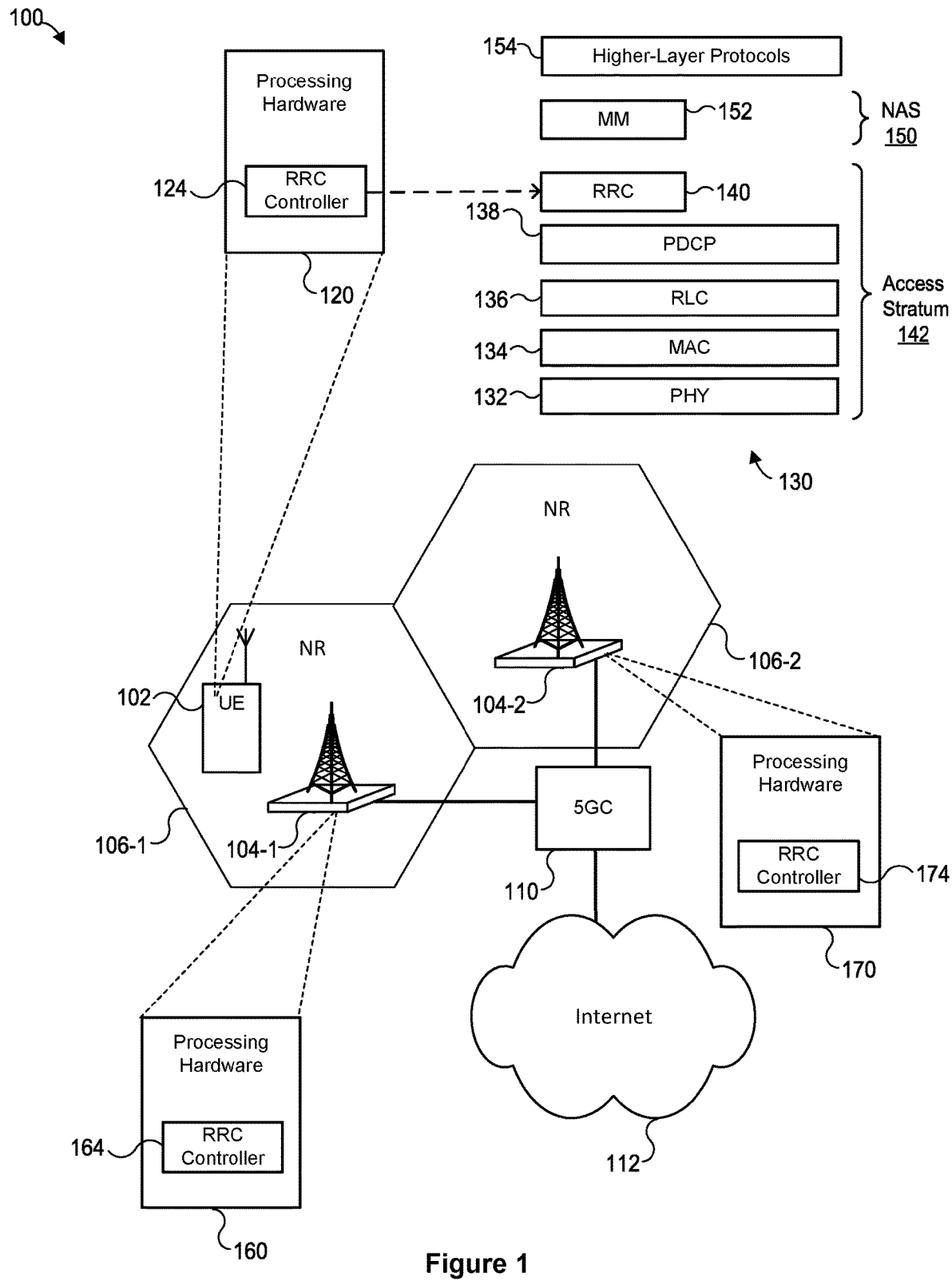
FIG. 1 is a block diagram of an example wireless communication network in which a user device and base stations of this disclosure can communicate segmented RRC messages.

Referring first to FIG. 1, a UE 102 can operate in an example wireless communication network 100. The wireless communication network 100 includes base stations 104-1 and 104-2, associated with respective cells 106-1 and 106-2. While FIG. 1 depicts each of base stations 104-1 and 104-2 as serving only one cell, it is understood that the base station 104-1 and/or the base station 104-2 may also cover one or more additional cells not shown in FIG. 1. In general, the wireless communication network 100 can include any number of base stations, and each of the base stations can cover one, two, three, or any other suitable number of cells.

The base stations 104-1 and 104-2 may each operate as a 5G Node B (gNB), for example, and are referred to as such in the example messaging diagrams of FIGS. 2 through 8 (discussed below). As seen in FIG. 1, the base station 104-1 and the base station 104-2 are both connected to a 5GC 110, which is in turn connected to the Internet 112. In various alternative implementations and/or scenarios, the wireless communication network 100 does not include the base station 104-2 and/or the cell 106-2, or the base station 104-2 is a next-generation evolved Node B (ng-eNB) and the cell 106-2 is an Evolved Universal Terrestrial Radio Access (EUTRA) cell, etc.

The UE 102 can support an NR air interface, and exchange messages with the base station 104-1 when operating in the cell 106-1 or the base station 104-2 when operating in the cell 106-2. In other implementations, the UE 102 also can support a EUTRA air interface, and exchange messages with the base station 104-1 over 5G NR when operating in the cell 106-1, and with the base station 104-2 over EUTRA when operating in the cell 106-2. As discussed below, the UE 102 can be any suitable device capable of wireless communications.

The UE 102 is equipped with processing hardware 120, which can include one or more general-purpose processors (e.g., CPUs) and a non-transitory computer-readable memory storing instructions that the one or more general-purpose processors can execute. Additionally or alternatively, the processing hardware 120 can include special-purpose processing units, such as a wireless communication chipset, for example. The processing hardware 120 includes an RRC controller 124. While not shown in FIG. 1, the processing hardware 120 may also include a controller for each of a number of other layers and/or layer groupings, such as a NAS controller, a packet data convergence protocol (PDCP) controller, a medium access control (MAC) controller, and so on.

The RRC controller 124 is responsible for inbound messaging, outbound messaging, and internal procedures at the corresponding layer of a wireless communication protocol stack 130, discussed further below. The RRC controller 124 can be implemented using any suitable combination of hardware, software, and/or firmware. In one example implementation, the RRC controller 124 comprises a set of instructions that defines respective components of the operating system of the UE 102, and one or more CPUs of the processing hardware 120 execute these instructions to perform the RRC functions. In another implementation, the RRC controller 124 is implemented using firmware as a part of a wireless communication chipset.

The protocol stack 130, illustrated in a simplified manner in FIG. 1, includes, among other possible layers, a physical (PHY) layer 132, a MAC layer 134, a radio link control (RLC) layer 136, a PDCP layer 138, and an RRC layer 140, as parts of an access stratum 142. NAS layer(s) 150 of the protocol stack 130 may include, among other possible layers, one or more mobility management (MM) layers 152 for handling registration, attachment, or tracking area update procedures. As illustrated in FIG. 1, the protocol stack 130 also supports higher-layer protocols 154 for various services and applications. For example, the higher-layer protocols 154 may include Internet Protocol (IP), Transmission Control Protocol (TCP), and User Datagram Protocol (UDP).

The RRC layer 140 packages and interprets RRC PDUs, which may contain any of various types of RRC messages associated with different RRC procedures (e.g., connection establishment or reestablishment procedures, a UE capability transfer procedure, a measurement reporting procedure, etc.). The various layers 132, 134, 136, 138, 140, 152 and 154 may be ordered as shown in FIG. 1. It is understood, however, that in some implementations and/or situations, one or more of the depicted layers may operate in a manner that does not strictly conform to the ordering shown in FIG. 1.

On the UE 102 side, the RRC layer 140 (i.e., RRC controller 124) can divide one or more types of RRC messages into multiple segments, and transmit the segments sequentially. In some implementations, the RRC controller 124 accomplishes this by including a particular RRC message in an RRC PDU, and then segmenting the RRC PDU such that each RRC PDU segment includes a corresponding RRC message segment. In this disclosure, reference to the transmission or reception of an RRC message segment may indicate (in some implementations) that the RRC message segment is transmitted or received, respectively, within a segment of an RRC PDU. As one example, if the UE 102 receives a UECapabilityEnquiry message from the base station 104-1, the RRC controller 124 may respond by generating a UECapabilityInformation message, packaging the UECapabilityInformation message in an RRC PDU, dividing the RRC PDU into multiple segments, and then causing the UE 102 to sequentially transmit the RRC PDU segments to the base station 104-1.

The base stations 104-1 and 104-2 are equipped with processing hardware 160 and 170, respectively, each of which can include one or more general-purpose processors (e.g., CPUs) and a non-transitory computer-readable memory storing instructions that the one or more general-purpose processors can execute. Additionally or alternatively, the processing hardware 160 and the processing hardware 170 can each include special-purpose processing units, such as a wireless communication chipset, for example. Similar to the processing hardware 120 of the UE 102, the processing hardware 160 of base station 104-1 includes an RRC controller 164, and the processing hardware 170 of base station 104-2 includes an RRC controller 174. Whereas the RRC controller 124 of the UE 102 implements functionality of the RRC layer 140 on the user device 102 side, the RRC controller 164 implements functionality of the RRC layer 140 on the base station 104-1 side, and the RRC controller 174 implements functionality of the RRC layer 140 on the base station 104-2 side. While not shown in FIG. 1, each of the processing hardware 160 and the processing hardware 170 may also include a controller for each of a number of other layers and/or layer groupings, such as a PDCP controller and/or a MAC controller.

The RRC controller 164 and the RRC controller 174 can each be implemented using any suitable combination of hardware, software, and/or firmware. In one example implementation, each of the RRC controller 164 and the RRC controller 174 comprises a set of instructions that defines respective components of the operating system of the base station 104-1 or the base station 104-2, respectively, and one or more CPUs of the respective processing hardware (160 or 170) execute these instructions to perform the respective RRC functions. In another implementation, each of the RRC controller 164 and the RRC controller 174 is implemented using firmware as a part of a respective wireless communication chipset. In other implementations, the base stations 104-1 and 104-2 may be co-located, and share some of the same processing hardware.

The RRC controller 164 and the RRC controller 174 can process one or more types of RRC messages that the respective base station (104-1 or 104-2) receives as multiple, sequential segments. As one example, if the base station 104-1 receives a sequence of segments of a UECapabilityInformation message from the UE 102 (e.g., within a sequence of RRC PDU segments), the RRC controller 164 can successfully interpret the segmented message (i.e., determine the capabilities of the UE 102 as indicated in the entire UECapabilityInformation message).

For simplicity, FIG. 1 does not depict various components of the UE 102 and the base stations 104-1, 104-2. In addition to the layer-specific controllers mentioned above, for example, the UE 102 and the base stations 104-1, 104-2 include respective transceivers, which comprise various hardware, firmware, and software components that are configured to transmit and receive wireless signals according to the NR (and possibly EUTRA, etc.) air interface. The processing hardware 120, the processing hardware 160, and the processing hardware 170 can send commands and exchange information with the respective transceivers as needed to perform various RRC or NAS procedures, or communicate with other network elements, etc.

Example message sequences that the UE 102, base station 104-1, base station 104-2, and/or 5GC 110 can implement and execute will now be discussed with reference to FIGS. 2 through 8. The UE 102, base station 104-1, base station 104-2, and/or 5GC 110 can implement at least some of the acts described below in software, firmware, hardware, or any suitable combination of software, firmware, and hardware. Although FIGS. 2 through 8 are discussed below with reference to the components depicted in FIG. 1 and a 5G system, in general any suitable components or wireless communication network may be used.

Figure 2A:
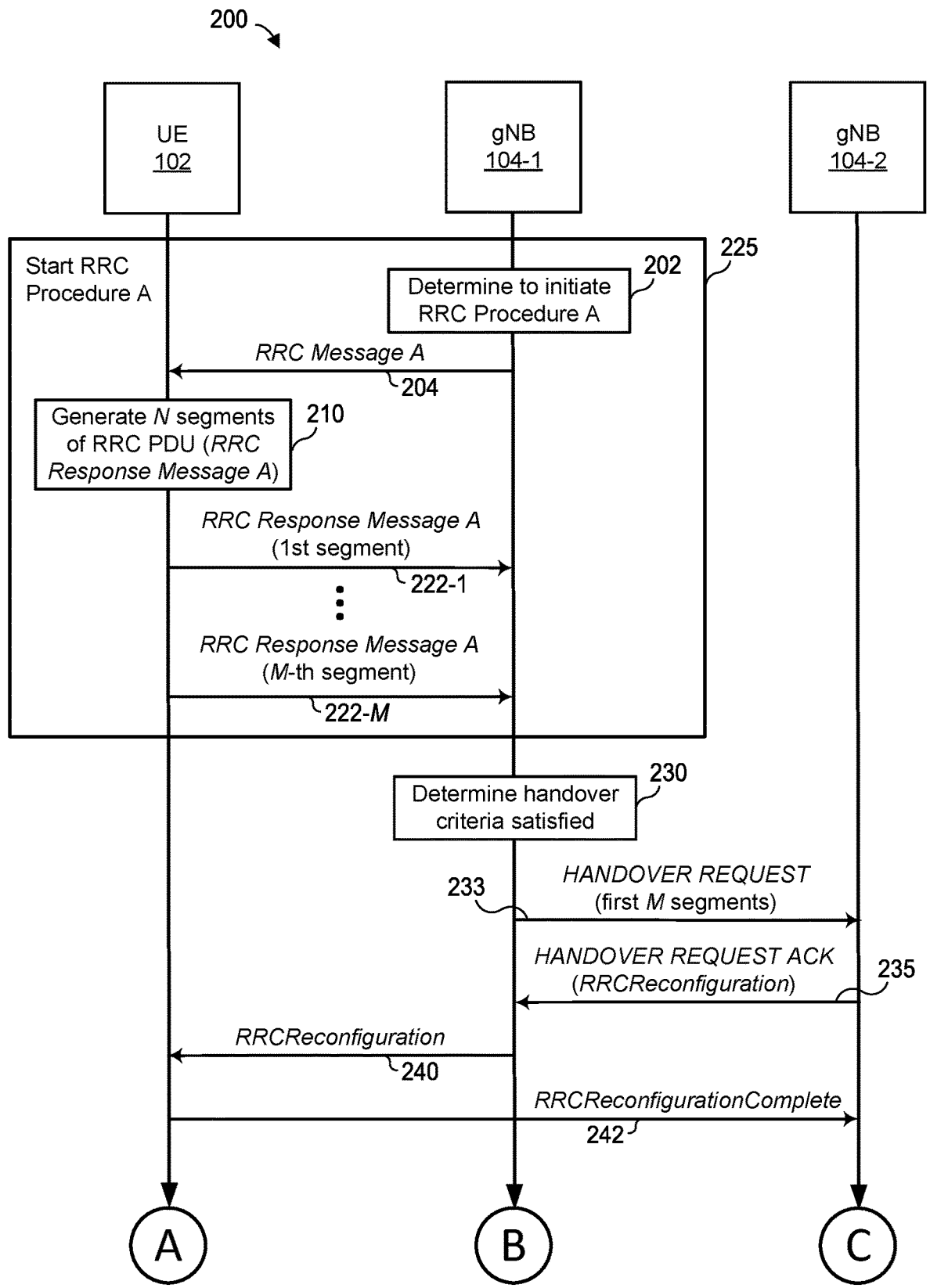
FIGS. 2 through 8 depict various messaging diagrams related to the transmission of a segmented RRC message in the wireless communication network of FIG. 1.
Figure 2B:
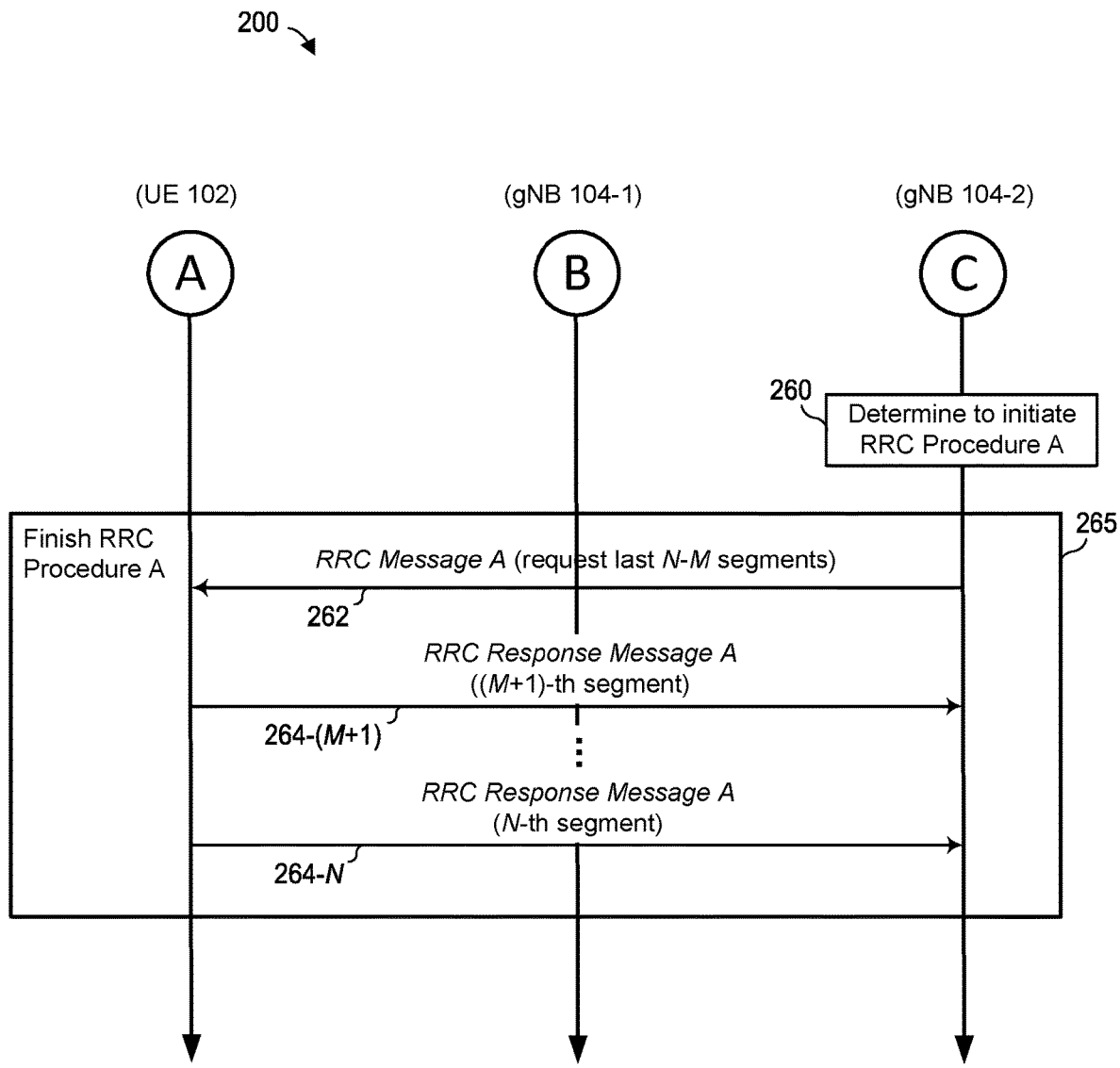
Figure 3:
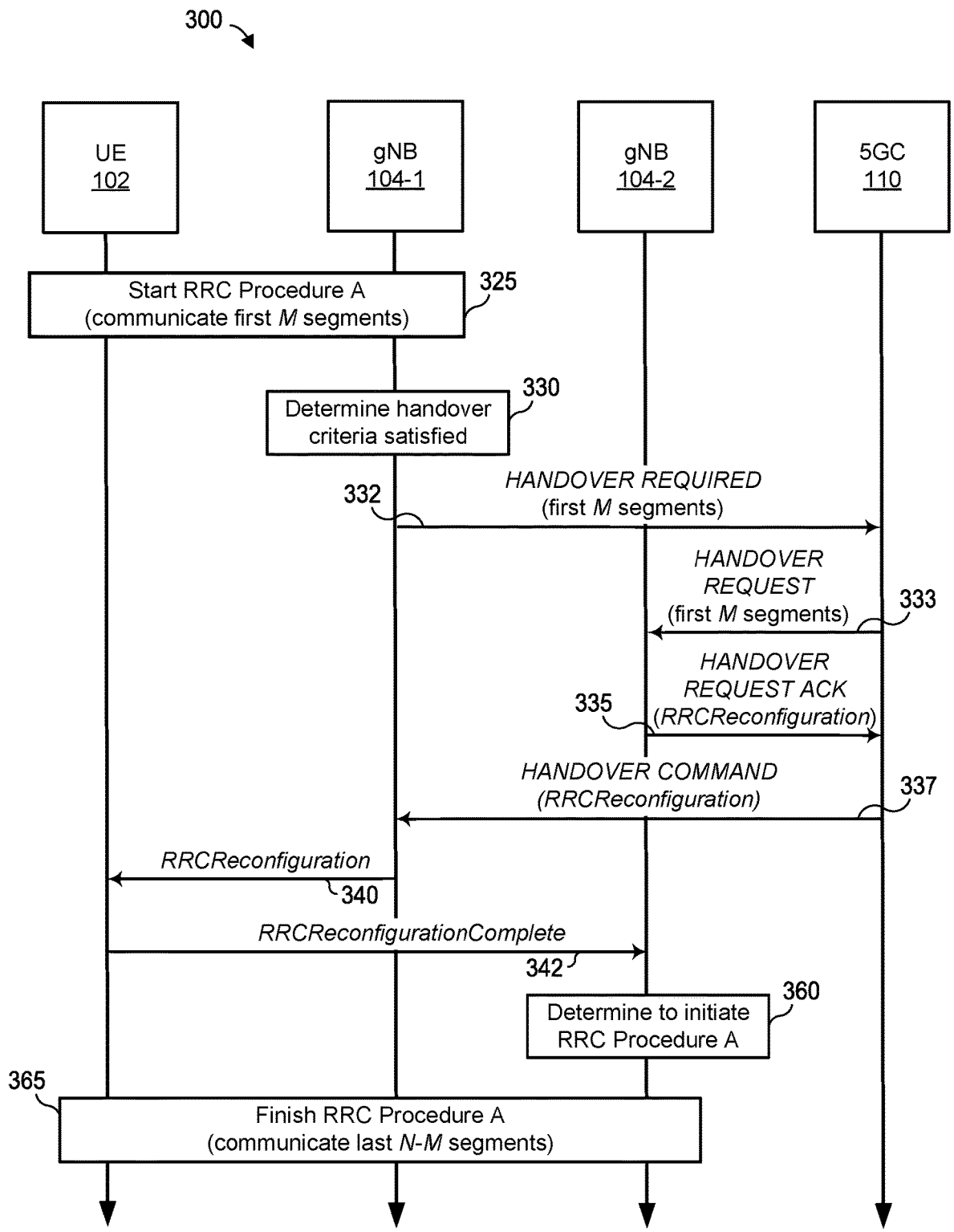
Figure 4:
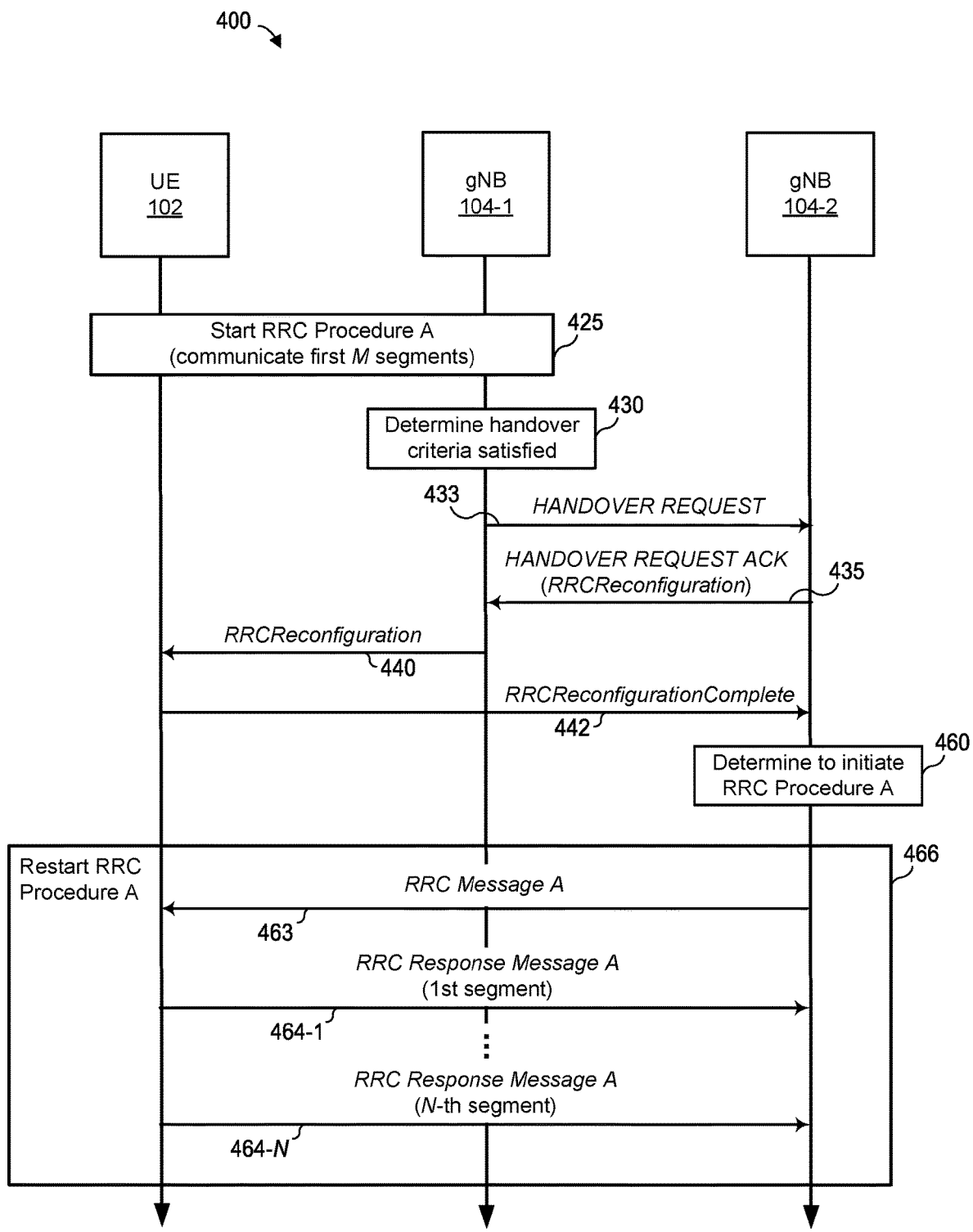
Figure 5:
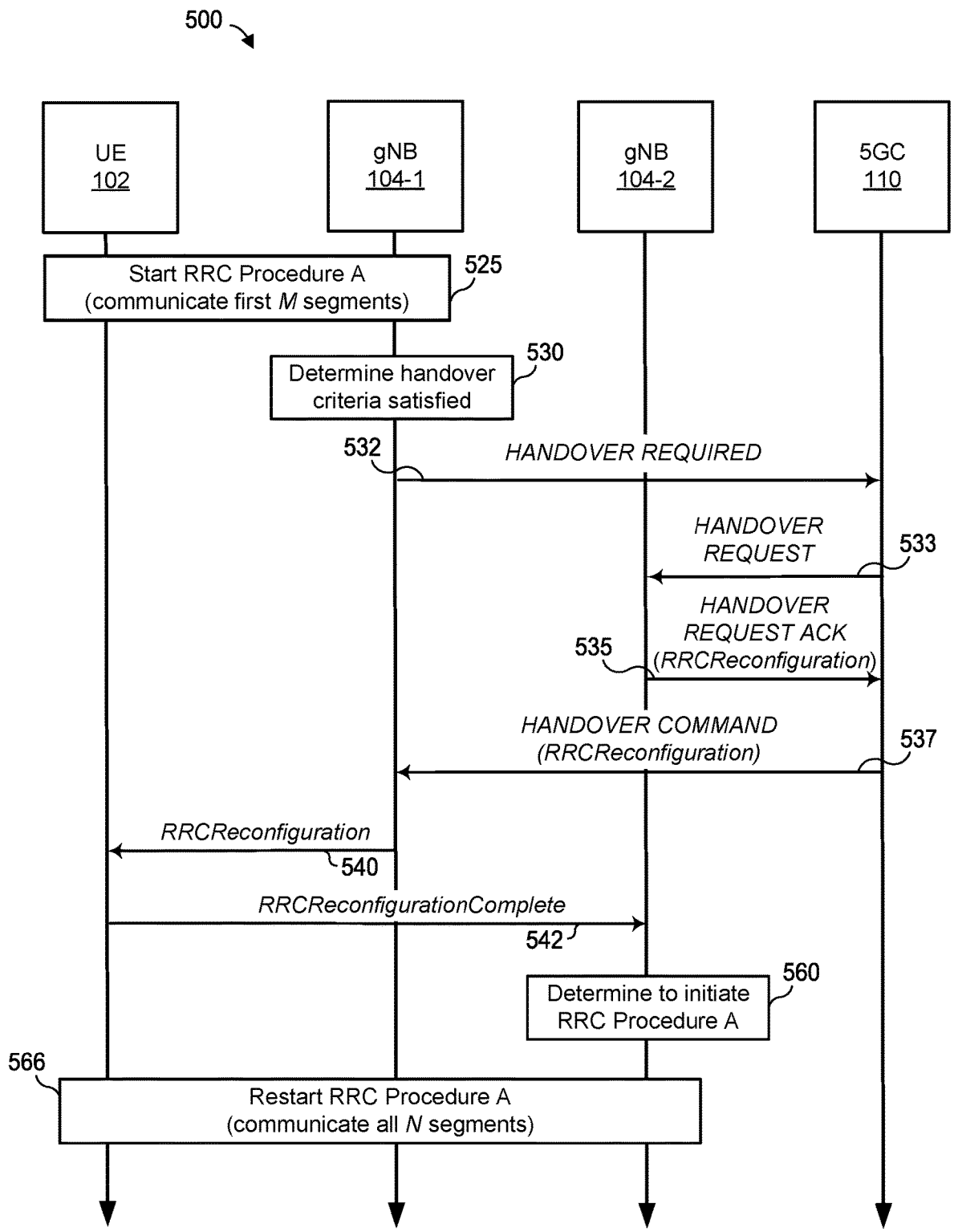
Figure 6:
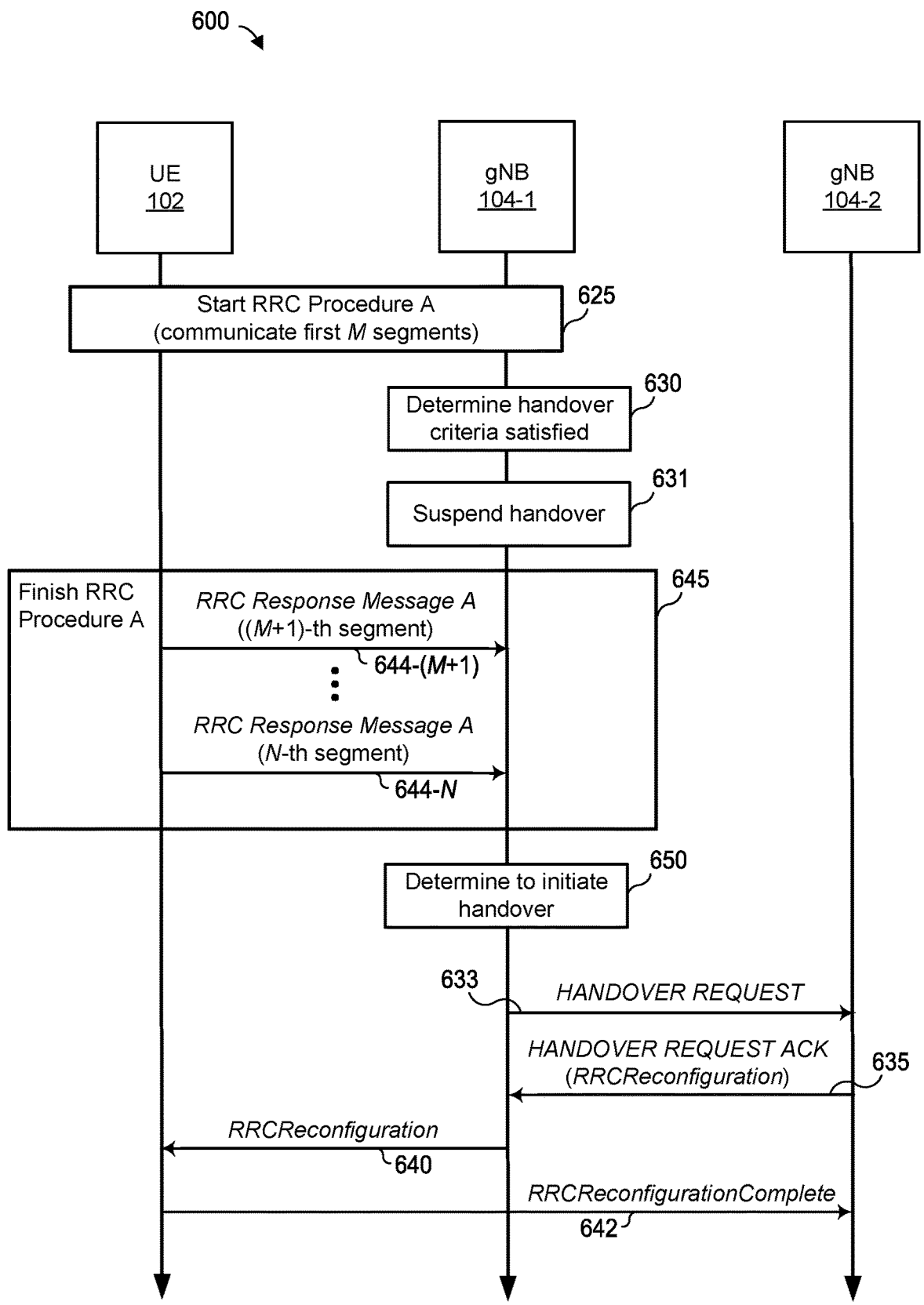
Figure 7:
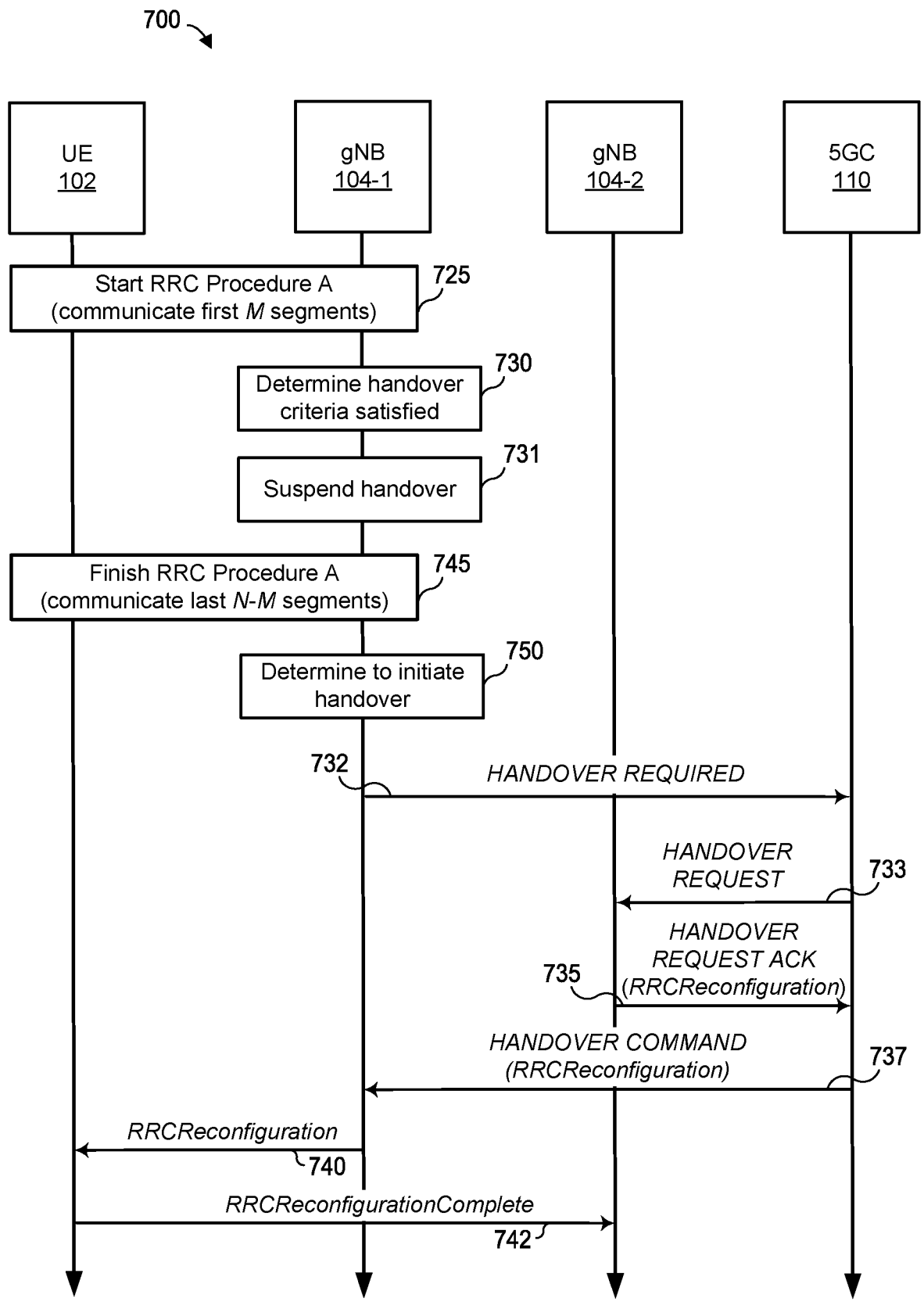
Figure 8:
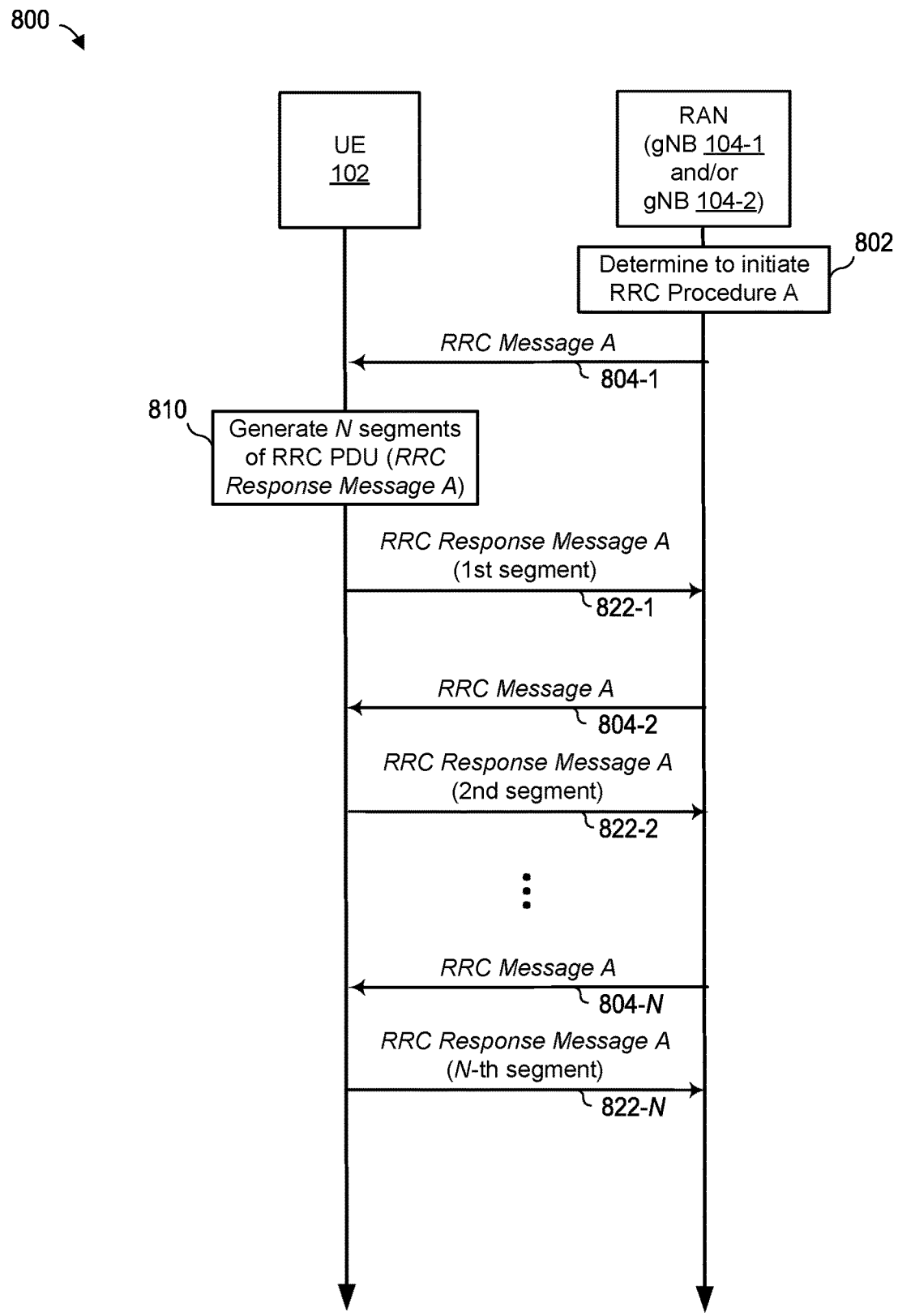

FIGS. 2 and 3 depict Xn and NG scenarios, respectively, for a technique in which the base station 104-1 does not suspend a handover triggered while the base station 104-1 is receiving segments of an RRC message from the UE 102, and in which the base station 104-1 directly or indirectly forwards received segments to the base station 104-2 (such that the UE 102 does not need to restart the transmission of the segmented RRC message after completion of the handover). FIGS. 4 and 5 depict Xn and NG scenarios, respectively, for a technique in which the base station 104-1 does not suspend the handover, and does not forward received segments to the base station 104-2 (such that the UE 102 restarts the transmission of the segmented RRC message after completion of the handover). FIGS. 6 and 7 depict Xn and NG scenarios, respectively, for a technique in which the base station 104-1 suspends the handover until after the base station 104-1 receives all segments of the RRC message. Finally, FIG. 8 depicts an alternative technique in which the UE 102 transmits each segment in response to a different RRC message from the base station 104-1.

Referring first to FIG. 2 (i.e., FIGS. 2A and 2B), a messaging diagram 200 depicts example messages that the UE 102, base station 104-1 and base station 104-2 of FIG. 1 may exchange, along with associated operations, according to some implementations and scenarios. As noted above, FIG. 2 depicts a technique in which the base station 104-1 does not suspend a handover triggered while the base station 104-1 is receiving segments of an RRC message from the UE 102, and in which the base station 104-1 forwards received segments to the base station 104-2. In the messaging diagram 200, the RRC controller 124 of the UE 102 may perform (or trigger, e.g., in the case of message transmission) all operations of the UE 102. Similarly, the RRC controller 164 may perform or trigger the operations of the base station 104-1, and the RRC controller 174 may perform or trigger the operations of the base station 104-2.

At the start of the messaging diagram 200, the UE 102 and the base station 104-1 have already established an RRC connection. As seen in FIG. 2A, the base station 104-1 determines 202 to initiate a particular RRC procedure ("RRC Procedure A"), and then transmits 204 an RRC message ("RRC Message A") to the UE 102. RRC Procedure A may be a UE capability transfer procedure as defined in 3GPP TS 38.331 v15.6.0, and RRC Message A may be a UECapabilityEnquiry message, for example. As used herein, the term "RRC procedure" may refer to a complete RRC procedure as defined by a specification (e.g., a UE capability transfer procedure as defined by the 5G specification), or may refer to any subset of such a procedure, so long as the procedure or procedure subset includes communication of at least one RRC message between a user device and base station (e.g., UE 102 and base station 104-1) via a radio link.

In response to receiving and processing the RRC Message A, the UE 102 generates 210 all N segments of an RRC PDU containing an RRC response message ("RRC Response Message A"), where N is an integer greater than one (e.g., two, four, 10, 16, etc.). If the RRC Procedure A is a UE capability transfer procedure, for example, then RRC Response Message A may be a UECapabilityInformation message that specifies various capabilities of the UE 102 (e.g., radio access technologies supported by the UE 102, etc.). As one example, generating 210 the N segments may include generating the RRC Response Message A, including the RRC Response Message A in an RRC PDU, and then dividing the RRC PDU into the N segments.

The UE 102 then sequentially transmits (222-1 through 222-M) the first M of the N segments to the base station 104-1, where M is an integer greater than zero and less than N. In other implementations, the UE 102 does not generate 210 all N segments before transmitting 222-1 the first segment. For example, the UE 102 may instead generate each segment just prior to transmitting 222 that segment, such that the generating 210 and transmitting 222 operations are interleaved. In still other implementations, the UE 102 may generate 210 the N segments before receiving RRC Message A, and store the N segments for later transmission in response to receiving RRC Message A. The determining 202, transmitting 204, generating 210, and transmitting 222-1 through 222-M are collectively referred to herein as starting 225 RRC Procedure A. In some implementations (not reflected in FIG. 2A), starting 225 RRC Procedure A does not include any operations (e.g., transmissions) by base station 104-1.

After the base station 104-1 receives the M-th segment (corresponding to the transmission 222-M), the base station 104-1 determines 230 that one or more criteria for a handover is/are satisfied. In one implementation and/or scenario, the base station 104-1 determines to initiate a handover (i.e., determines 230 that the handover criteria is/are satisfied) based on an RRC message that the base station 104-1 receives from the UE 102 (not shown in FIG. 2A). In particular, the base station 104-1 may receive a MeasurementReport RRC message after (or shortly before, etc.) receiving the M-th segment, and then determine 230 that the handover criteria is/are satisfied based on the contents of the MeasurementReport RRC message. For example, the MeasurementReport RRC message may indicate that the signal strength/quality of the current serving cell for UE 102 (i.e. cell 106-1) is poor and the signal strength/quality of a neighboring cell (i.e., cell 106-2) is good. In another example, the base station 104-1 may determine to initiate the handover based on measurement results derived from uplink transmissions that the base station 104-1 receives from the UE 102, without necessarily considering the signal quality associated with the cell 106-2. For example, the measurement results may indicate signal strength/quality of the current serving cell for UE 102 (i.e. cell 106-1) is poor enough to require handover (e.g., despite not knowing the signal quality associated with cell 106-2).

In the techniques of this disclosure, after the base station 104-1 determines 230 that the one or more criteria for the handover is/are satisfied, the base station 104-1 follows one of two courses of action, depending on which technique is used. In one technique, reflected in FIG. 2 (as well as FIGS. 3 through 5 discussed below), the base station 104-1 initiates the triggered handover procedure without waiting to receive the remaining segments (i.e., the last N-M segments). In other techniques, reflected in FIGS. 6 and 7 and discussed below, the base station 104-1 instead suspends the triggered handover until after the base station 104-1 receives the remaining segments from the UE 102.

In the technique of FIG. 2, after the base station 104-1 determines 230 that the one or more criteria for the handover is/are satisfied, the base station 104-1 initiates a handover to base station 104-2 by transmitting 233 a HANDOVER REQUEST message to the base station 104-2. In the implementation shown in FIG. 2, the base station 104-1 includes the received M segments in the HANDOVER REQUEST message. In other implementations, the base station 104-1 transmits the M segments to the base station 104-2 in a different message (e.g., before or after the HANDOVER REQUEST message).

In response to the HANDOVER REQUEST message, the base station 104-2 transmits 235 a HANDOVER REQUEST ACKNOWLEDGE message, which includes an RRCReconfiguration message, to the base station 104-1. After receiving the HANDOVER REQUEST ACKNOWLEDGE message, the base station 104-1 transmits 240 the RRCReconfiguration message to the UE 102. The RRCReconfiguration message configures the UE 102 to switch (handover) from the current cell (cell 106-1) to the cell 106-2. In response to the RRCReconfiguration message, the UE 102 transmits 242 an RRCReconfigurationComplete message to the base station 104-2.

Referring now to FIG. 2B, after the base station 104-2 receives the RRCReconfigurationComplete message, the base station 104-2 determines 260 to initiate RRC Procedure A (i.e., the same RRC procedure that the base station 104-1 determined 202 to initiate previously). In response to the determination 260, the base station 104-2 transmits 262 an RRC Message A to the UE 102. In the implementation shown in FIG. 2, the base station 104-2 includes a request for the last/remaining N-M segments in the RRC Message A. For example, the RRC Message A may include a field or information element requesting the last N-M segments. The request may take any suitable form that can convey to the UE 102 that the base station 104-2 still needs the (M+1)-th through N-th segments. For example, the request may include a field with a value equal to M+1 (representing the next segment that the base station 104-2 needs in the sequence of segments), a field with a value equal to M (indicating the last segment that the base station 104-1 successfully received), a field with a value equal to N-M (indicating the number of segments at the end of the RRC PDU that the base station 104-2 still needs), and so on.

In response to receiving the RRC Message A in the transmission 262, including the request for the last N-M segments, the UE 102 sequentially transmits (264-(M+1) through 264-N) the last N-M segments to the base station 104-2. The transmission 262 and the transmissions 264-(M+1) through 264-N are collectively referred to herein as finishing 265 RRC Procedure A. After the base station 104-2 receives the last N-M segments, the base station 104-2 can assemble all of the segments, including the first M segments that were received from the base station 104-1 in transmission 233, into the complete RRC PDU.

In one implementation, the base station 104-1 may not be able to immediately initiate the handover (i.e., transmit 233 the HANDOVER REQUEST message) in response to the determination 230, due to the processing time that base station 104-1 requires to prepare for the handover, to generate the HANDOVER REQUEST message, and/or to package the M segments. During this processing delay, the base station 104-1 may continue to sequentially receive the (M+1)-th through (M+L)-th segments from the UE 102, where 0<L<(N−M). After the processing delay, the base station 104-1 initiates the handover by transmitting 233 the HANDOVER REQUEST message to the base station 104-2. In such an implementation, the base station 104-1 may include the first M+L segments in the HANDOVER REQUEST message (or possibly include one or more of the segments in a later, additional message sent to the base station 104-2), in which case the base station 104-2 may request only the last N-M-L messages in the transmission 262. Alternatively, the base station 104-1 may simply discard the (M+1)-th through (M+L)-th segments, in which case that base station 104-1 still forwards only the first M segments to the base station 104-2, and the base station 104-2 still requests the last N-M segments from the UE 102.

In another implementation, the base station 104-1 may continue to sequentially receive the (M+1)-th through (M+L)-th segments from the UE 102, where 0<L<(N−M) before the base station 104-1 transmits 240 the RRCReconfiguration message. In such an implementation, the base station 104-1 may include the first M segments in the HANDOVER REQUEST message and include the (M+1)-th through (M+L)-th segments in a later, additional message sent to the base station 104-2, in which case the base station 104-2 may request only the last N-M-L messages in the transmission 262. In another implementation, the base station 104-1 may include the first M+L segments in a later message sent to the base station 104-2, in which case the base station 104-2 may request only the last N-M-L messages in the transmission 262. Alternatively, the base station 104-1 may simply discard the (M+1)-th through (M+L)-th segments, in which case that base station 104-1 still forwards only the first M segments to the base station 104-2, and the base station 104-2 still requests the last N-M segments from the UE 102.

In the implementation of FIG. 2, the UE 102 and the base station 104-1 can collectively ensure that the base station 104-2 receives all N segments of RRC Response Message A, resulting in successful completion of RRC Procedure A. Moreover, the base station 104-1 and base station 104-2 can successfully perform the handover, without greatly increasing the likelihood of substantial adverse effects (e.g., radio link failure or poor system performance). This is because the timing of the handover is, at least in some implementations, unaltered (or only slightly altered) relative to the determination 230, irrespective of whether RRC Procedure A is currently in progress.

Referring next to FIG. 3, a messaging diagram 300 depicts example messages that the UE 102, base station 104-1, base station 104-2, and 5GC 110 of FIG. 1 may exchange, along with associated operations, according to some implementations and/or scenarios. As noted above, FIG. 3 depicts a technique similar to that of FIG. 2, but for an NG (core network assisted) handover rather than an Xn handover. In the messaging diagram 300, the RRC controller 124 of the UE 102 may perform (or trigger, e.g., in the case of message transmission) all operations of the UE 102. Similarly, the RRC controllers 164 and 174 may perform or trigger certain operations of the base stations 104-1 and 104-2, respectively (e.g., processing or transmission of RRC messages exchanged with the UE 102). In some implementations, higher-layer controllers of base stations 104-1 and 104-2 (not shown in FIG. 1) process, generate and/or trigger the communications exchanged with the 5GC 110.

At the start of the messaging diagram 300, the UE 102 and the base station 104-1 have already established an RRC connection. As seen in FIG. 3, the UE 102 (and possibly also the base station 104-1) starts 325 RRC Procedure A, which includes the UE 102 transmitting the first M segments to the base station 104-1. Starting 325 RRC Procedure A in messaging diagram 300 may be the same as, or similar to, starting 225 RRC Procedure A in messaging diagram 200.

Next, the base station 104-1 determines 330 that one or more handover criteria is/are satisfied. The determination 330 in messaging diagram 300 may be the same as, or similar to, the determination 230 in messaging diagram 200. After the determination 330, the base station 104-1 transmits 332 a HANDOVER REQUIRED message to the 5GC 110. In the implementation shown in FIG. 3, the base station 104-1 includes the received M segments in the HANDOVER REQUIRED message. In other implementations, the base station 104-1 transmits the M segments to the 5GC 110 in a different message (e.g., before or after the HANDOVER REQUIRED message).

In response to the HANDOVER REQUIRED message, the 5GC 110 transmits 333 a HANDOVER REQUEST message to the base station 104-2. In the implementation shown in FIG. 3, the 5GC 110 includes the first M segments in the HANDOVER REQUEST message. In other implementations, the 5GC 110 transmits the M segments to the base station 104-2 in a different message (e.g., before or after the HANDOVER REQUEST message).

After receiving the HANDOVER REQUEST message, the base station 104-2 transmits 335 a HANDOVER REQUEST ACKNOWLEDGE message, which includes an RRCReconfiguration message, to the 5GC 110. In response to the HANDOVER REQUEST ACKNOWLEDGE message, the 5GC 110 transmits 337 a HANDOVER COMMAND message, which also includes the RRCReconfiguration message, to the base station 104-1.

After receiving the HANDOVER COMMAND message, the base station 104-1 transmits 340 the RRCReconfiguration message to the UE 102. The RRCReconfiguration message configures the UE 102 to switch (handover) from the current cell (cell 106-1) to the cell 106-2. The UE 102 responds to the RRCReconfiguration message by transmitting 342 an RRCReconfigurationComplete message to the base station 104-2. At some point after receiving the RRCReconfigurationComplete message, the base station 104-2 determines 360 to initiate RRC Procedure A. The determination 360 of messaging diagram 300 may be the same as, or similar to, the determination 260 of messaging diagram 200.

After the determination 360, the UE 102 (and possibly also the base station 104-2) finishes 365 RRC Procedure A, which includes the UE 102 transmitting the last N-M segments to the base station 104-2. Finishing 365 RRC Procedure A in messaging diagram 300 may be the same as, or similar to, finishing 265 RRC Procedure A in messaging diagram 200. After the base station 104-2 receives the last N-M segments, the base station 104-2 can assemble all of the segments, including the first M segments that were received from the base station 104-1, into the complete RRC PDU.

In one implementation, the base station 104-1 may not be able to immediately initiate the handover (i.e., transmit 332 the HANDOVER REQUIRED message) in response to the determination 330, due to the processing time that base station 104-1 requires to prepare for the handover, to generate the HANDOVER REQUIRED message, and/or to package the M segments. During this processing delay, the base station 104-1 may continue to sequentially receive the (M+1)-th through (M+L)-th segments from the UE 102, where 0<L<(N−M). After the processing delay, the base station 104-1 initiates the handover by transmitting 332 the HANDOVER REQUIRED message to the 5GC 110. In such an implementation, the base station 104-1 may include the first M+L segments in the HANDOVER REQUIRED message (or possibly include one or more of the segments in a later, additional message), in which case the 5GC 110 may include the first M+L segments in the HANDOVER REQUEST message (or possibly include one or more of the segments in a later, additional message), and the base station 104-2 may request only the last N-M-L messages from the UE 102 (during the finishing 365). Alternatively, the base station 104-1 may simply discard the (M+1)-th through (M+L)-th segments, in which case the base station 104-1 still forwards only the first M segments to the base station 104-2, the 5GC 110 still forwards only the first M segments to the base station 104-2, and the base station 104-2 still requests the last N-M segments from the UE 102.

In another implementation, the base station 104-1 may continue to sequentially receive the (M+1)-th through (M+L)-th segments from the UE 102, where 0<L<(N−M). In such an implementation, the base station 104-1 may include the first M segments in the HANDOVER REQUIRED message and include the (M+1)-th through (M+L)-th segments in a later, additional message sent to the 5GC 110, in which case the 5GC 110 may include the first M segments in the HANDOVER REQUEST message and include the (M+1)-th through (M+L)-th segments in a later, additional message sent to the base station 104-2, and the base station 104-2 may request only the last N-M-L messages from the UE 102 (during the finishing 365). In another implementations, the base station 104-1 may include the first M+L segments in a later, additional message sent to the 5GC 110, in which case the 5GC 110 may include the first M+L segments in a later, additional message sent to the base station 104-2, and the base station 104-2 may request only the last N-M-L messages from the UE 102 (during the finishing 365). Alternatively, the base station 104-1 may simply discard the (M+1)-th through (M+L)-th segments, in which case the base station 104-1 still forwards only the first M segments to the base station 104-2, the 5GC 110 still forwards only the first M segments to the base station 104-2, and the base station 104-2 still requests the last N-M segments from the UE 102.

In the implementation of FIG. 3, the UE 102, base station 104-1, and 5GC 110 can collectively ensure that the base station 104-2 receives all N segments of RRC Response Message A, resulting in successful completion of RRC Procedure A. Moreover, the base station 104-1, base station 104-2, and 5GC 110 can successfully perform the handover, without greatly increasing the likelihood of substantial adverse effects (e.g., radio link failure or poor system performance). This is because the timing of the handover is, at least in some implementations, unaltered (or only slightly altered) relative to the determination 330, irrespective of whether RRC Procedure A is currently in progress.

Referring next to FIG. 4, a messaging diagram 400 depicts example messages that the UE 102, base station 104-1, and base station 104-2 of FIG. 1 may exchange, along with associated operations, according to some implementations and/or scenarios. As noted above, FIG. 4 depicts a technique in which, like the technique of FIGS. 2 and 3, the base station 104-1 does not suspend the handover. However, unlike the technique of FIGS. 2 and 3, the base station 104-1 does not forward received segments (directly or indirectly) to the base station 104-2, and thus the UE 102 restarts the entire transmission of the segmented RRC message (now to base station 104-2) after completion of the handover.

In the messaging diagram 400, the RRC controller 124 of the UE 102 may perform (or trigger, e.g., in the case of message transmission) all operations of the UE 102. Similarly, the RRC controller 164 may perform or trigger the operations of the base station 104-1, and the RRC controller 174 may perform or trigger the operations of the base station 104-2.

At the start of the messaging diagram 400, the UE 102 and the base station 104-1 have already established an RRC connection. As seen in FIG. 4, the UE 102 (and possibly also the base station 104-1) starts 425 RRC Procedure A, which includes the UE 102 transmitting the first M segments to the base station 104-1. Starting 425 RRC Procedure A in messaging diagram 400 may be the same as, or similar to, starting 225 RRC Procedure A in messaging diagram 200.

Next, the base station 104-1 determines 430 that one or more handover criteria is/are satisfied. The determination 430 in messaging diagram 400 may be the same as, or similar to, the determination 230 in messaging diagram 200. After the determination 430, the base station 104-1 transmits 433 a HANDOVER REQUEST message to the base station 104-2. Unlike the HANDOVER REQUEST message in the transmission 233 of messaging diagram 200, however, the HANDOVER REQUEST message of the transmission 433 does not include the first M segments, or any other segments, of the RRC Response Message A. The base station 104-1 also does not send the first M segments or any other segments of the RRC Response Message A in a later, additional message to the base station 104-2. In other implementations, the HANDOVER REQUEST message (or the later, additional message) does include the first M segments, but the base station 104-2 discards/ignores the M segments.

The base station 104-2 responds to the HANDOVER REQUEST message by transmitting 435 a HANDOVER REQUEST ACKNOWLEDGE, which includes an RRCReconfiguration message, to the base station 104-1. Thereafter, the base station 104-1 transmits 440 the RRCReconfiguration message to the UE 102. The RRCReconfiguration message configures the UE 102 to switch (handover) from the current cell (cell 106-1) to the cell 106-2. The UE 102 responds to the RRCReconfiguration message by transmitting 442 an RRCReconfigurationComplete message to the base station 104-2.

At some point after receiving the RRCReconfiguration-Complete message, the base station 104-2 determines 460 to initiate RRC Procedure A. The determination 460 of messaging diagram 400 may be the same as, or similar to, the determination 260 of messaging diagram 200. In response to determination 460, the base station 104-2 transmits 463 an RRC Message A to the UE 102. Unlike the RRC Message A in the transmission 262 of messaging diagram 200, however, the RRC Message A in the transmission 463 does not include a request for the remaining N-M segments, or for any other segments.

In response to receiving the RRC Message A in the transmission 463, the UE 102 sequentially transmits (464-1 through 464-N) all N segments to the base station 104-2. The transmission 463 and the transmissions 464-1 through 464-N are collectively referred to herein as restarting 466 RRC Procedure A. After the base station 104-2 receives the N segments from the UE 102, the base station 104-2 can assemble all of the segments into the complete RRC PDU.

In the implementation of FIG. 4, the UE 102 can ensure that the base station 104-2 receives all N segments of RRC Response Message A without relying on any forwarding of segments (e.g., from base station 104-1 to base station 104-2), resulting in successful completion of RRC Procedure A. Moreover, the base station 104-1 and base station 104-2 can successfully perform the handover, without greatly increasing the likelihood of substantial adverse effects (e.g., radio link failure or poor system performance). This is because the timing of the handover is, at least in some implementations, unaltered (or only slightly altered) relative to the determination 430, irrespective of whether RRC Procedure A is currently in progress.

Referring next to FIG. 5, a messaging diagram 500 depicts example messages that the UE 102, base station 104-1, base station 104-2, and 5GC 110 of FIG. 1 may exchange, along with associated operations, according to some implementations and/or scenarios. As noted above, FIG. 5 depicts a technique similar to that of FIG. 4, but for an NG (core network assisted) handover rather than an Xn handover. In the messaging diagram 500, the RRC controller 124 of the UE 102 may perform (or trigger, e.g., in the case of message transmission) all operations of the UE 102. Similarly, the RRC controllers 164 and 174 may perform or trigger certain operations of the base stations 104-1 and 104-2, respectively (e.g., processing or transmission of RRC messages exchanged with the UE 102). In some implementations, higher-layer controllers of base stations 104-1 and 104-2 (not shown in FIG. 1) process, generate and/or trigger the communications exchanged with the 5GC 110.

At the start of the messaging diagram 500, the UE 102 and the base station 104-1 have already established an RRC connection. As seen in FIG. 5, the UE 102 (and possibly also the base station 104-1) starts 525 RRC Procedure A, which includes the UE 102 transmitting the first M segments to the base station 104-1. Starting 525 RRC Procedure A in messaging diagram 500 may be the same as, or similar to, starting 225 RRC Procedure A in messaging diagram 200.

Next, the base station 104-1 determines 530 that one or more handover criteria is/are satisfied. The determination 530 in messaging diagram 500 may be the same as, or similar to, the determination 230 in messaging diagram 200. After the determination 530, the base station 104-1 transmits 532 a HANDOVER REQUIRED message to the 5GC 110. Unlike the HANDOVER REQUIRED message in the transmission 332 of messaging diagram 300, however, the HANDOVER REQUIRED message in the transmission 532 of FIG. 5 does not include the first M segments, or any other segments, of RRC Response Message A. The base station 104-1 also does not send the first M segments or any other segments of the RRC Response Message A in a later, additional message to the 5GC 110.

In response to the HANDOVER REQUIRED message, the 5GC 110 transmits 533 a HANDOVER REQUEST message to the base station 104-2. Unlike the HANDOVER REQUEST message in the transmission 333 of messaging diagram 300, the handover request message in the transmission 533 of FIG. 5 does not include the first M segments, or any other segments, of the RRC Response Message A. The base station 104-1 also does not send the first M segments or any other segments of the RRC Response Message A in a later, additional message to the base station 104-2. In other implementations, the HANDOVER REQUIRED message in transmission 532 (or the later, additional message sent by the base station 104-1 to the 5GC 110) does include the first M segments, and possibly other segments, but the 5GC 110 does not include the M segments or any other segments in the HANDOVER REQUEST message in transmission 533. The 5GC 110 also does not send the first M segments or any other segments of the RRC Response Message A in a later, additional message to the base station 104-2. In still other implementations, the HANDOVER REQUIRED message in transmission 532 (or the later, additional message sent by the base station 104-1 to the 5GC 110) and the HANDOVER REQUEST message in transmission 533 (or the later, additional message sent by the 5GC 110 to the base station 104-2) both include the first M segments, and possibly other segments, but the base station 104-2 discard/ignores the M (and possibly additional) segments.

After receiving the HANDOVER REQUEST message, the base station 104-2 transmits 535 a HANDOVER REQUEST ACKNOWLEDGE message, which includes an RRCReconfiguration message, to the 5GC 110. In response to the HANDOVER REQUEST ACKNOWLEDGE message, the 5GC 110 transmits 537 a HANDOVER COMMAND message, which also includes the RRCReconfiguration message, to the base station 104-1.

After receiving the HANDOVER COMMAND message, the base station 104-1 transmits 540 the RRCReconfiguration message to the UE 102. The RRCReconfiguration message configures the UE 102 to switch (handover) from the current cell (cell 106-1) to the cell 106-2. The UE 102 responds to the RRCReconfiguration message by transmitting 542 an RRCReconfigurationComplete message to the base station 104-2. At some point after receiving the RRCReconfigurationComplete message, the base station 104-2 determines 560 to initiate RRC Procedure A. The determination 560 of messaging diagram 500 may be the same as, or similar to, the determination 260 of messaging diagram 200.

After the determination 560, the UE 102 (and possibly also the base station 104-2) restarts 566 RRC Procedure A, which includes the UE 102 transmitting all N segments to the base station 104-2. Restarting 566 RRC Procedure A in messaging diagram 500 may be the same as, or similar to, restarting 466 RRC Procedure A in messaging diagram 400. After the base station 104-2 receives the N segments from the UE 102, the base station 104-2 can assemble all of the segments into the complete RRC PDU.

In the implementation of FIG. 5, the UE 102 can ensure that the base station 104-2 receives all N segments of RRC Response Message A without relying on any forwarding of segments (e.g., from base station 104-1 to base station 104-2), resulting in successful completion of RRC Procedure A. Moreover, the base station 104-1, base station 104-2, and 5GC 110 can successfully perform the handover, without greatly increasing the likelihood of substantial adverse effects (e.g., radio link failure or poor system performance). This is because the timing of the handover is, at least in some implementations, unaltered (or only slightly altered) relative to the determination 530, irrespective of whether RRC Procedure A is currently in progress.

Turning now to FIG. 6, a messaging diagram 600 depicts example messages that the UE 102, base station 104-1, and base station 104-2 of FIG. 1 may exchange, along with associated operations, according to some implementations and/or scenarios. As noted above, FIG. 6 depicts a technique in which, unlike the techniques of FIGS. 2 through 5, the base station 104-1 suspends the handover until after completion of RRC Procedure A. In the messaging diagram 600, the RRC controller 124 of the UE 102 may perform (or trigger, e.g., in the case of message transmission) all operations of the UE 102. Similarly, the RRC controller 164 may perform or trigger the operations of the base station 104-1, and the RRC controller 174 may perform or trigger the operations of the base station 104-2.

At the start of the messaging diagram 600, the UE 102 and the base station 104-1 have already established an RRC connection. As seen in FIG. 6, the UE 102 (and possibly also the base station 104-1) starts 625 RRC Procedure A, which includes the UE 102 transmitting the first M segments to the base station 104-1. Starting 625 RRC Procedure A in messaging diagram 600 may be the same as, or similar to, starting 225 RRC Procedure A in messaging diagram 200.

Next, the base station 104-1 determines 630 that one or more handover criteria is/are satisfied. The determination 630 in messaging diagram 600 may be the same as, or similar to, the determination 230 in messaging diagram 200. In response to the determination 630, however, the base station 104-1 suspends 631 the handover procedure. That is, the base station 104-1 does not initiate the handover procedure (e.g., refrains from transmitting a HANDOVER REQUEST message such as in transmission 233 of FIG. 2) until after completion of RRC Procedure A. Instead of initiating the handover procedure, the base station 104-1 waits to receive the remaining N-M segments from the UE 102. While the base station 104-1 is suspending 631 the handover, the UE 102 sequentially transmits (644-(M+1) through 644-N) the last/remaining N-M segments to the base station 104-1. The transmissions 644-(M+1) through 644-N to the base station 104-1 are collectively referred to herein as finishing 645 RRC Procedure A. Unlike the finishing 265 of messaging diagram 200 and the finishing 365 of messaging diagram 300, the finishing 645 depicted in FIG. 6 involves a communication between the UE 102 and the originating base station (104-1) rather than the new base station (104-2), and does not involve the UE 102 receiving any RRC messages (e.g., another RRC Message A) from the RAN. After the base station 104-1 receives the N segments from the UE 102, the base station 104-1 can assemble all of the segments into the complete RRC PDU.

After the base station 104-1 receives the N-th segment (and either before or after the base station 104-1 assembles the complete RRC PDU), the base station 104-1 determines 650 to initiate the handover (i.e., resumes the suspended handover procedure). In some implementations, the base station 104-1 only determines 650 to initiate the handover if the handover criteria is/are still satisfied. For example, the base station 104-1 may once again determine that the handover criteria is/are satisfied (e.g., similar to the determination 630) after receiving the N-th segment, and before determining 650 to initiate the handover. That is, the determination 650 may occur in response to determining that the handover criteria is/are still satisfied.

In response to determining 650 to initiate the handover, the base station 104-1 transmits 633 a HANDOVER REQUEST message to the base station 104-2. The base station 104-2 responds to the HANDOVER REQUEST message by transmitting 635 a HANDOVER REQUEST ACKNOWLEDGE message, which includes an RRCReconfiguration message, to the base station 104-1. Thereafter, the base station 104-1 transmits 640 the RRCReconfiguration message to the UE 102. The RRCReconfiguration message configures the UE 102 to switch (handover) from the current cell (cell 106-1) to the cell 106-2. The UE 102 responds to the RRCReconfiguration message by transmitting 642 the RRCReconfigurationComplete message to the base station 104-2.

In some implementations, the base station 104-1 may include the RRC Response Message A or information elements in the RRC Response Message A in the HANDOVER REQUEST message in transmission 633. Thus, the base station 104-2 does not need to perform the RRC Procedure A with the UE 102 after the handover.

In the implementation of FIG. 6, the UE 102 can ensure that the base station 104-1 receives all N segments of RRC Response Message A, resulting in successful completion of RRC Procedure A. Moreover, if the delay caused by finishing 645 RRC Procedure A is not long, the base station 104-1 and base station 104-2 can successfully perform the handover without greatly increasing the likelihood of substantial adverse effects (e.g., radio link failure or poor system performance).

Referring next to FIG. 7, a messaging diagram 700 depicts example messages that the UE 102, base station 104-1, base station 104-2, and 5GC 110 of FIG. 1 may exchange, along with associated operations, according to some implementations and/or scenarios. As noted above, FIG. 7 depicts a technique similar to that of FIG. 6, but for an NG (core network assisted) handover rather than an Xn handover. In the messaging diagram 700, the RRC controller 124 of the UE 102 may perform (or trigger, e.g., in the case of message transmission) all operations of the UE 102. Similarly, the RRC controllers 164 and 174 may perform or trigger certain operations of the base stations 104-1 and 104-2, respectively (e.g., processing or transmission of RRC messages exchanged with the UE 102). In some implementations, higher-layer controllers of base stations 104-1 and 104-2 (not shown in FIG. 1) process, generate and/or trigger the communications exchanged with the 5GC 110.

At the start of the messaging diagram 700, the UE 102 and the base station 104-1 have already established an RRC connection. As seen in FIG. 7, the UE 102 (and possibly also the base station 104-1) starts 725 RRC Procedure A, which includes the UE 102 transmitting the first M segments to the base station 104-1. Starting 725 RRC Procedure A in messaging diagram 700 may be the same as, or similar to, starting 225 RRC Procedure A in messaging diagram 200.

Next, the base station 104-1 determines 730 that one or more handover criteria is/are satisfied. The determination 730 in messaging diagram 700 may be the same as, or similar to, the determination 230 in messaging diagram 200. In response to the determination 730, the base station 104-1 suspends 731 the handover procedure. That is, the base station 104-1 does not initiate the handover procedure (e.g., refrains from transmitting a HANDOVER REQUIRED message such as in transmission 332 of FIG. 3) until after completion of RRC Procedure A. Instead of initiating the handover procedure, the base station 104-1 waits to receive the remaining N-M segments from the UE 102. While the base station 104-1 is suspending 731 the handover, the UE 102 (and possibly the base station 104-1) finishes 745 RRC Procedure A, which includes the UE 102 sequentially transmitting the last/remaining N-M segments to the base station 104-1. After the base station 104-1 receives the N segments from the UE 102, the base station 104-1 can assemble all of the segments into the complete RRC PDU.

After the base station 104-1 receives the N-th segment (and either before or after the base station 104-1 assembles the complete RRC PDU), the base station 104-1 determines 750 to initiate the handover (i.e., resumes the suspended handover procedure). In some implementations, the base station 104-1 only determines 750 to initiate the handover if the handover criteria is/are still satisfied (e.g., as discussed above with reference to the determination 650 of messaging diagram 600). After the determination 750, the base station 104-1 transmits 732 a handover required message to the 5GC 110. In response to the HANDOVER REQUIRED message, the 5GC 110 transmits 733 a HANDOVER REQUEST message to the base station 104-2. In response to the HANDOVER REQUEST message, the base station 104-2 transmits 735 a HANDOVER REQUEST ACKNOWLEDGE message, which includes an RRCReconfiguration message, to the 5GC 110. In response to the HANDOVER REQUEST ACKNOWLEDGE message, the 5GC 110 transmits 737 a HANDOVER COMMAND message, which also includes the RRCReconfiguration message, to the base station 104-1. After receiving the HANDOVER COMMAND message, the base station 104-1 transmits 740 the RRCReconfiguration message to the UE 102. The RRCReconfiguration message configures the UE 102 to switch (handover) from the current cell (cell 106-1) to the cell 106-2. The UE 102 responds to the RRCReconfiguration message by transmitting 742 an RRCReconfigurationComplete message to the base station 104-2.

In some implementations, the base station 104-1 may include the RRC Response Message A or information elements in the RRC Response Message A in the HANDOVER REQUIRED message in transmission 732, in which case the 5GC 110 may include the RRC Response Message A or information elements in the RRC Response Message A in the HANDOVER REQUEST message in transmission 733. Thus, the base station 104-2 does not need to perform the RRC Procedure A with the UE 102 after the handover.

In the implementation of FIG. 7, the UE 102 can ensure that the base station 104-1 receives all N segments of RRC Response Message A, resulting in successful completion of RRC Procedure A. Moreover, if the delay caused by finishing 745 RRC Procedure A is not long, the base station 104-1 and base station 104-2 can successfully perform the handover without greatly increasing the likelihood of substantial adverse effects (e.g., radio link failure or poor system performance).

Turning now to FIG. 8, a messaging diagram 800 depicts example messages that the UE 102 and the RAN (i.e., base station 104-1 and/or base station 104-2) of FIG. 1 may exchange, along with associated operations, according to some implementations and/or scenarios. As noted above, FIG. 8 depicts an alternative technique in which the UE 102 transmits each segment in response to a different RRC message (e.g., a different instance of a single type of RRC message) from the RAN. In the messaging diagram 800, the RRC controller 124 of the UE 102 may perform (or trigger, e.g., in the case of message transmission) all operations of the UE 102, and the RRC controller 164 or the RRC controller 174 may perform or trigger the operations of the RAN.

At the start of the messaging diagram 800, the UE 102 and a base station of the RAN (e.g., base station 104-1) have already established an RRC connection. As seen in FIG. 8, the RAN determines 802 to initiate RRC Procedure A, and then transmits 804-1 a first RRC Message A to the UE 102. As in the techniques discussed above, RRC Procedure A may be a UE capability transfer procedure as defined in 3GPP TS 38.331 v15.6.0, and RRC Message A may be a UECapabilityEnquiry message, for example.

After receiving RRC Message A, the UE 102 generates 810 all N segments of an RRC PDU containing an RRC response message ("RRC Response Message A"), where N is an integer greater than one (e.g., two, four, 10, 16, etc.). If RRC Procedure A is a UE capability transfer procedure, for example, then RRC Response Message A may be a UECapabilityInformation message that specifies various capabilities of the UE 102 (e.g., radio access technologies supported by the UE 102, etc.). The generation 810 of messaging diagram 800 may be similar to the generation 210 of messaging diagram 200. For example, as discussed above with reference to FIG. 2, the UE 102 may instead generate the N segments before the determination 802, or may instead generate each segment just before transmitting that segment (e.g., in response to receiving the respective RRC Message A from the RAN, as discussed below).

In response to receiving RRC Message A, and after generating 810 at least the first segment of the RRC PDU containing RRC Response Message A, the UE 102 transmits 822-1 the first segment of the RRC PDU (and thus, the first segment of RRC Response Message A) to the RAN. Unlike the techniques of FIGS. 2 through 7, however, the UE 102 does not proceed to automatically transmit the next (second) segment, but instead waits for another RRC Message A from the RAN. When the RAN transmits 804-2 the second RRC Message A (e.g., a second UECapabilityEnquiry message), the UE 102 responds by transmitting 822-2 the second segment of the RRC PDU to the RAN. This continues until the RAN transmits 804-N an N-th RRC Message A to the UE 102, and the UE 102 responds by transmitting the N-th segment of the RRC PDU to the RAN. Thus, the RAN initiates N instances of RRC Procedure A, with each RRC Message A serving as a request for the next segment of the RRC PDU. In some implementations, each RRC Message A includes information (e.g., a field or information element) requesting or instructing that the UE 102 transmit a segment of the RRC PDU. Additionally or alternatively, in some implementations, each RRC Message A includes the segment number of the specific segment that the RAN is requesting from the UE 102.

In the technique of FIG. 8, if a handover is triggered at any point during the communication of the N segments, the originating base station (e.g., base station 104-1) has the flexibility to either immediately perform the handover (without having to concurrently receive and process any segments from the UE 102), or to instead suspend the handover until that base station requests and receives all segments. In this manner, the base station can avoid receiving a segment at a time when the base station is unable to process the segment, or at a time when the segment would disrupt the handover.

In implementations and/or scenarios where the base station does not suspend the handover, FIG. 8 may reflect the operations of two base stations. For example, if the base station 104-1 hands the UE 102 over to the base station 104-2 after the base station 104-1 receives L segments from the UE 102 (0<L<N), the base station 104-1 may determine 802 to initiate RRC Procedure A, transmit (804-1 through 804-L) the first L instances of RRC Message A, and receive the segments in transmissions 822-1 through 822-L, while the base station 104-2 may transmit (804-(L+1) through 804-N) the last N-L instances of RRC Message A and receive the segments in transmissions 822-(L+1) through 822-N. In one such implementation, the base station 104-1 forwards the first L segments to the base station 104-2, either directly (e.g., via a HANDOVER REQUEST message similar to that in transmission 233 of messaging diagram 200) or indirectly (e.g., via a HANDOVER REQUIRED message similar to that in transmission 332 of messaging diagram 300 and a HANDOVER REQUEST message similar to that in transmission 333 of messaging diagram 300).

More generally, the technique of FIG. 8 may enable the base station 104-1 and/or UE 102 to handle other types of RRC procedures (i.e., other than handovers) triggered during communication of the N segments (e.g., a triggered communication of a NAS message from the UE 102 to the base station 104-1 or vice versa, a triggered communication of a measurement report RRC message from the UE 102 to the base station 104-1, a triggered communication of a UE reconfiguration message from the base station 104-1 to the UE 102, etc.). In some implementations and/or scenarios, for example, the base station 104-1 can decide to transmit an RRCReconfiguration message after receiving a particular segment, and before transmitting the next RRC Message A to UE 102. As another example, in some implementations and/or scenarios, the UE 102 can decide to send a MeasurementReport RRC message or a NAS message immediately after transmitting a particular segment (i.e., without waiting for the next RRC Message A from the base station 104-1).

In some implementations, the base station 104-1 or UE 102 decides whether to suspend the handover or other triggered RRC procedure based on the capabilities of the UE 102 or base station 104-1, respectively. For example, the UE 102 may transmit to the base station 104-1 a message informing the base station 104-1 that the UE 102 cannot receive and/or process any unrelated RRC messages (e.g., reconfiguration messages) while transmitting segments of a first RRC message (e.g., a UE capability information message), in which case the base station 104-1 may request all message segments before sending the UE 102 an unrelated RRC message.

In any of the implementations and/or scenarios discussed above with reference to FIGS. 2 through 8, RRC Message A may include information (e.g., a field or information element) indicating that the UE 102 can (i.e., has permission to) transmit a UE capability information or other particular RRC message (e.g., a UECapabilityInformation RRC message) in multiple segments. In these implementations, if RRC Message A does not include such in indicator, the UE 102 does not divide RRC Response Message A into segments.

Also in any of the implementations and scenarios discussed above with reference to FIGS. 2 through 8, the RAN (i.e., the base station 104-1 and/or base station 104-2) may utilize transaction identifiers to determine which RRC response messages (e.g., RRC Response Message A) transmitted by the UE 102 correspond to which RRC messages (e.g., RRC Message A) transmitted by the RAN. In some implementations, for example, the RAN sets a transaction identifier to a first value, and includes that transaction identifier in the RRC Message A (e.g., in transmission 204, in a similar transmission when starting 325, 425, 525, 625 or 725 RRC Procedure A, or in transmissions 804). In response, the UE 102 sets a transaction identifier to the first value, and includes that transaction identifier in the RRC Response Message A (e.g., in transmissions 222, in similar transmissions when finishing 365, 645, 745 or restarting 466, 566 RRC Procedure A, or in transmissions 822). By inspecting this transaction identifier, the RAN can determine that the RRC Response Message A belongs to the same transaction as the RRC Message A. The UE 102 may include the transaction identifier in each segment of RRC Response Message A, for example. In such an implementation, the RAN may be unable to assemble RRC Response Message A segments if those segments include different transaction identifiers. In some implementations of the technique of FIG. 8, each different RRC Message A (in a respective one of transmissions 804-1 through 804-N) includes a different transaction identifier, in which case each responsive segment may include the same transaction identifier as the corresponding RRC Message A.

In some implementations, each segment of RRC Response Message A (or each segment of an RRC PDU including RRC Response Message A) includes a segment number indicating an order of that segment in a sequence. In such an implementation, the UE 102 may transmit segments of RRC Response Message A (or segments of an RRC PDU including RRC Response Message A) out of sequence. In the implementations discussed herein, it is understood that the number of a segment (e.g., first, last, M-th, N-th, etc.) merely refers to the time-order in which the user device (e.g., UE 102) transmits the segment, and not necessarily to any other ordering or sequencing of the segments. Additionally or alternatively, the UE 102 may include information in the last segment of RRC Response Message A (or the last segment of an RRC PDU including RRC Response Message A) to indicate that the segment is the last segment. The UE 102 may include the segment number and/or "last segment" information in RRC Response Message A by using a critical extensions field/information element of the RRC Response Message A.

Alternatively or additionally, in some implementations, the UE 102 includes each segment of RRC Response Message A (or each segment of an RRC PDU including RRC Response Message A) in a new RRC message. In one such implementation, the new RRC message includes a segment number indicating an order of the segment in the sequence. In this implementation, the UE 102 may transmit segments of the RRC Response Message A (or segments of an RRC PDU including the RRC Response Message A) out of sequence. In another implementation, one of the new RRC messages includes the last segment of the RRC Response Message A (or the last segment of an RRC PDU including the RRC Response Message A), and also includes an indication that the new RRC message includes the last segment of the RRC Response Message A.

In other implementations, the UE 102 does not include the transaction identifier associated with the RRC Message A in any segment of the RRC Response Message A. For example, the UE 102 may include a different transaction identifier/value in RRC Response Message A or the segments thereof, or may not include any transaction identifier at all. In these implementations, a base station (e.g., base station 104-1 or 104-2) may not know that the RRC Response Message A (or the segments thereof) and the RRC Message A belong to the same transaction until and unless the base station assembles all of the segments into the complete RRC PDU, and subsequently obtains the RRC Response Message A from the RRC PDU.

Also in any of the implementations and/or scenarios discussed above with reference to FIGS. 2 through 8, the UE 102 may indicate to the RAN whether the UE 102 supports receiving and/or processing a particular RRC message (e.g., a reconfiguration message) while the UE 102 is transmitting a segmented RRC message. If the UE 102 indicates that the UE 102 is permitted to do so, the RAN may operate according to the messaging diagram of FIG. 2, 3, 4 or 5. If the UE 102 does not indicate that the UE 102 is permitted to do so, the UE 102 instead operates according to the messaging diagram of FIG. 6 or 7. In the technique of FIG. 8, the base station 104-1 may determine the timing of each transmission 804-1 through 804-N based on whether the UE 102 indicates that UE 102 supports receiving and/or processing a particular RRC message (e.g., a reconfiguration message) while the UE 102 is transmitting a segmented RRC message. If the UE 102 indicates that the UE 102 does not support such functionality, for example, the base station 104-1 may decide to transmit (804-1 through 804-N) all N instances of RRC Message A before sending any other triggered RRC messages (e.g., a reconfiguration message) to the UE 102.

Also in any of the implementations and/or scenarios discussed above with reference to FIGS. 2 through 8, the UE 102 may dynamically determine N (i.e., the number of segments to generate for a given RRC message) based on information included in the received RRC Message A. For example, the UE 102 may generate $N_1$ segments of the responsive RRC PDU in some cases (e.g., if connecting to a first network), but generate $N_2$ segments of the responsive RRC PDU in other cases (e.g., if connecting to a second, different network), where $N_1 \neq N_2$. If N is set based on the network, the networks may be associated with different areas and/or difference operators, for example. In other implementations, N is fixed (e.g., the UE 102 always generates the same number of segments of the RRC PDU when receiving RRC Message A).

Also in any of the implementations and/or scenarios of FIGS. 2 through 8, RRC Procedure A may be any suitable RRC procedure. For example, as noted above, RRC Procedure A may be a UE capability transfer procedure, with RRC Message A being a UECapabilityEnquiry message and RRC Response Message A being a UECapabilityInformation message. As another example, RRC Procedure A may be a UE information procedure, with RRC Message A being a UEInformationRequest message and RRC Response Message A being a UEInformationResponse message. In any of these implementations, the segmented RRC PDU that contains RRC Message A may be a UL-DCCH-MESSAGE. In other implementations, the segmented RRC PDU may be RRC Message A itself.

In implementations and/or scenarios where RRC Response Message A is a UECapabilityInformation message, the message may include UE capabilities in EUTRA, UE capabilities in NR, and/or UE capabilities in a multi-radio access technology (multi-RAT), dual connectivity (MR-DC) system. In these implementations, the UECapabilityEnquiry message may include an indication (e.g., "eutra") that the UE 102 is to provide EUTRA capability information. In response, the UE 102 includes a UE-EUTRA-Capability information element in the UECapabilityInformation message. Alternatively, or in addition, the UECapabilityEnquiry message may include an indication (e.g., "nr") that the UE 102 is to provide NR capability information. In response, the UE 102 includes a UE-NR-Capability information element in the UECapabilityInformation message. Alternatively, or in addition, the UECapabilityEnquiry message may include an indication (e.g., "eutra-nr") that the UE 102 is to provide MR-DC capability information. In response, the UE 102 includes a UE-MRDC-Capability information element in the UECapabilityInformation message. The UE-EUTRA-Capability information element, if included in the UECapabilityInformation message, may also include the partial or complete capabilities of the UE 102 in MR-DC. In some implementations of the technique of FIG. 8, each RRC Message A is a UECapabilityEnquiry message that includes the same set of EUTRA, NR, and/or MR-DC capability indications. In other implementations of the technique of FIG. 8, the different instances of RRC Message A can contain different EUTRA, NR, and/or MR-DC capability indications.

Figure 9:
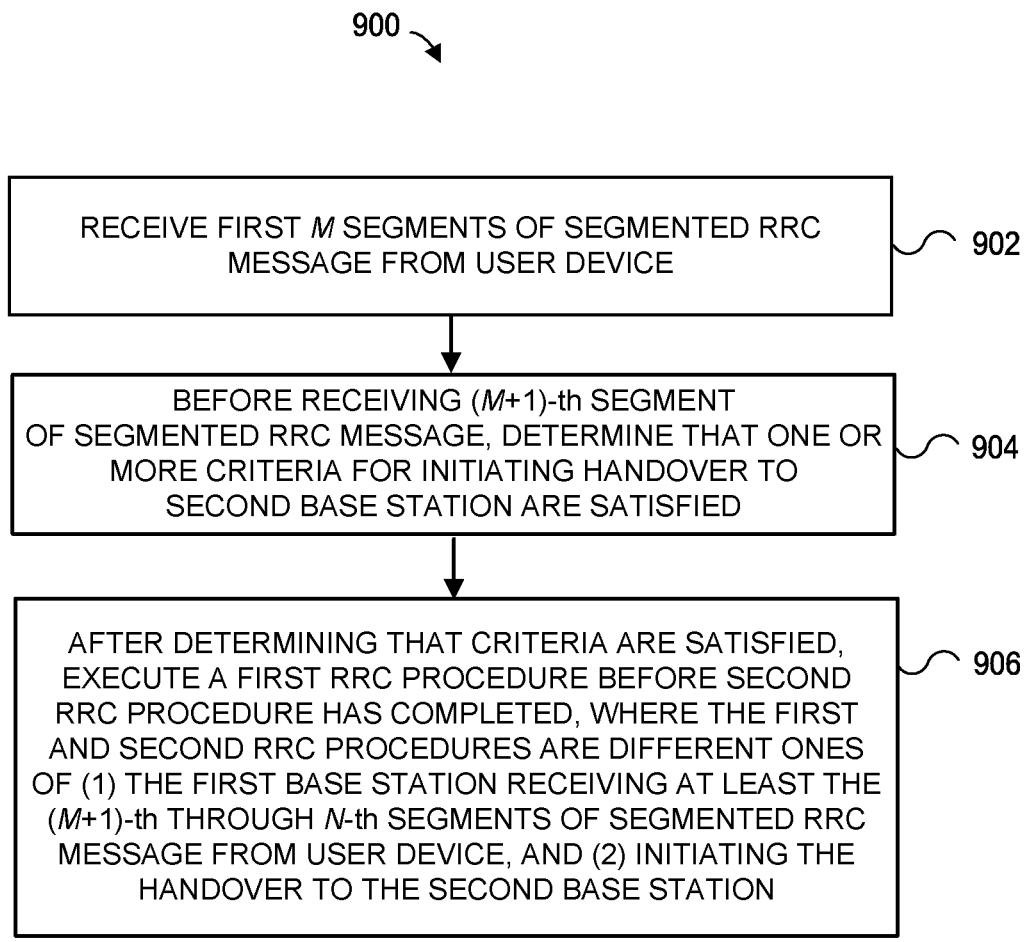
FIGS. 9 through 14 are flow diagrams of example methods for managing communication of a segmented RRC message that includes N segments.

Referring now to FIG. 9, an example method 900 for managing communication of a segmented RRC message can be implemented in a first base station (e.g., by processing hardware 160 of the base station 104-1) configured to communicate with a user device (e.g., the UE 102). The segmented RRC message includes N segments (e.g., within N respective segments of an RRC PDU), where N is an integer greater than one, and may be a message indicating capabilities of the user device (e.g., a UECapabilityInformation message), for example. In the method 900, the "first" base station is the originating base station in a handover procedure, and the "second" base station (referenced below) is the new base station in the handover procedure.

At block 902 of the method 900, the first base station receives the first M segments of the segmented RRC message from the user device, where M is an integer greater than zero and less than N. As a more specific example, the first base station may receive the segments via the segment transmissions 222-1 through 222-M of FIG. 2, or via the segment transmissions included in the starting 325, 425, 525, 625 or 725 of RRC Procedure A in FIG. 3, 4, 5, 6 or 7, respectively.

At block 904, before the first base station receives the (M+1)-th segment of the segmented RRC message from the user device, the first base station determines that one or more criteria for initiating a handover to another, second base station (e.g., base station 104-2) is/are satisfied. For example, block 904 may include determining that one or more measurement results obtained or derived from a measurement report (e.g., received from the user device and indicating signal strength and/or quality on the downlink) exceed one or more respective thresholds, and/or determining that one or more measurement results obtained locally (e.g., indicating signal strength and/or quality on the uplink) exceed one or more respective thresholds. As a more specific example, the determination at block 904 may include the determination 230, 330, 430, 530, 630 or 730 of FIG. 2, 3, 4, 5, 6 or 7, respectively.

At block 906, after determining that the criteria is/are satisfied, the first base station executes a first RRC procedure before a second RRC procedure has completed, where the "first" and "second" RRC procedures are different ones of (1) the first base station receiving the (M+1)-th through the N-th segment of the segmented RRC message from the user device, and (2) initiating the handover to the second base station. As a more specific example, the execution of the first RRC procedure may be (1) the transmission 233 of FIG. 2, (2) the transmission 332 of FIG. 3, (3) the transmission 433 of FIG. 4, (4) the transmission 533 of FIG. 5, (5) receiving the last N-M segments in the finishing 645 of FIG. 6, or (6) receiving the last N-M segments in the finishing 745 of FIG. 7. Continuing with this example, the execution of the second RRC procedure may be, respectively, (1) receiving the last N-M segments in the finishing 265 of FIG. 2, (2) receiving the last N-M segments in the finishing 365 of FIG. 3, (3) receiving the N segments in the restarting 466 of FIG. 4, (4) receiving the N segments in the restarting 566 of FIG. 5, (5) the transmission 633 of FIG. 6, or (6) the transmission 732 of FIG. 7.

Figure 10:
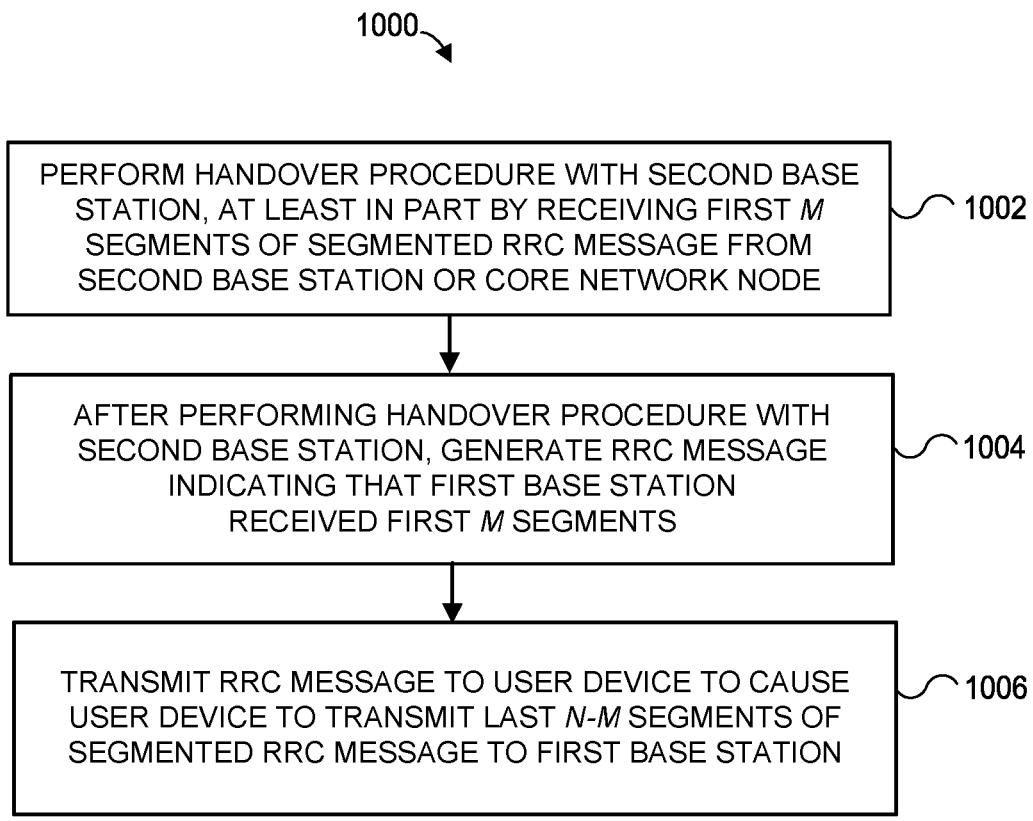

Referring now to FIG. 10, an example method 1000 for managing communication of a segmented RRC message can be implemented in a first base station (e.g., by processing hardware 170 of the base station 104-2) configured to communicate with a user device (e.g., the UE 102). The segmented RRC message includes N segments (e.g., within N respective segments of an RRC PDU), where N is an integer greater than one, and may be a message indicating capabilities of the user device (e.g., a UECapabilityInformation message), for example. In the method 1000, the "first" base station is the new base station in a handover procedure, and the "second" base station (referenced below) is the originating base station in the handover procedure.

At block 1002, the first base station performs a handover procedure with another, second base station (e.g., base station 104-1), at least in part by receiving a first M segments (0<M<N) of the segmented RRC message from the second base station or a core network node (e.g., a node within the 5GC 110). As a more specific example, the handover procedure may include the transmissions 233, 235 and 240 (and receiving the transmitted 242 RRCReconfigurationComplete message) of FIG. 2, or the transmissions 332, 333, 335, 337 and 340 (and possibly receiving the transmitted 342 RRCReconfigurationComplete message) of FIG. 3.

At block 1004, after performing the handover procedure with the second base station, the first base station generates an RRC message (e.g., a UECapabilityEnquiry message) indicating that the first base station received the first M segments.

At block 1006, the first base station transmits the RRC message to the user device to cause the user device to transmit the last N-M segments of the segmented RRC message to the first base station. As a more specific example, the first base station may transmit the RRC message in the transmission 262 of FIG. 2, or in a similar transmission within finishing 365 of FIG. 3, and the transmission triggered at the user device may be the transmissions 264-(M+1) through 264-N of FIG. 2, or similar transmissions within finishing 365 of FIG. 3, respectively.

Figure 11:
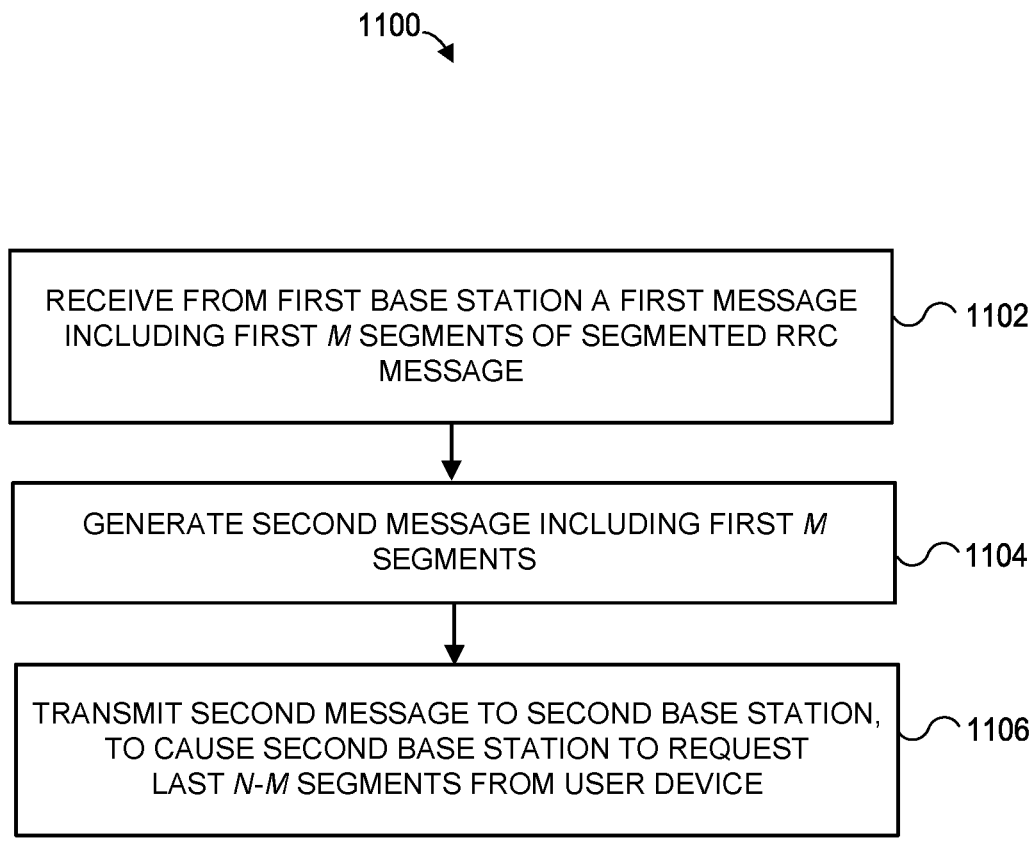

Referring now to FIG. 11, an example method 1100 for managing communication of a segmented RRC message can be implemented in a core network node (e.g., a device or system of the 5GC 110) configured to communicate with a first base station (e.g., base station 104-1) and a second base station (e.g., base station 104-2). The segmented RRC message includes N segments (e.g., within N respective segments of an RRC PDU), where N is an integer greater than one, and may be a message indicating capabilities of the user device (e.g., a UECapabilityInformation message), for example. In the method 1100, the "first" base station is the originating base station in a handover procedure, and the "second" base station is the new base station in the handover procedure.

At block 1102, the core network node receives from the first base station a first message (e.g., a handover required message) that includes the first M segments of the segments RRC message. As a more specific example, the core network node may receive the first message via the transmission 332 of FIG. 3. The first base station may have previously received the M segments from a user device (e.g., from the UE 102), for example.

At block 1104 the core network node generates a second message (e.g., a handover request message) that includes the first M segments, and at block 1106 the core network node transmits the second message to the second base station, to cause/trigger the second base station to request the last N-M segments from the user device. As a more specific example, the core network node may transmit the second message in the transmission 333 of FIG. 3.

Figure 12:
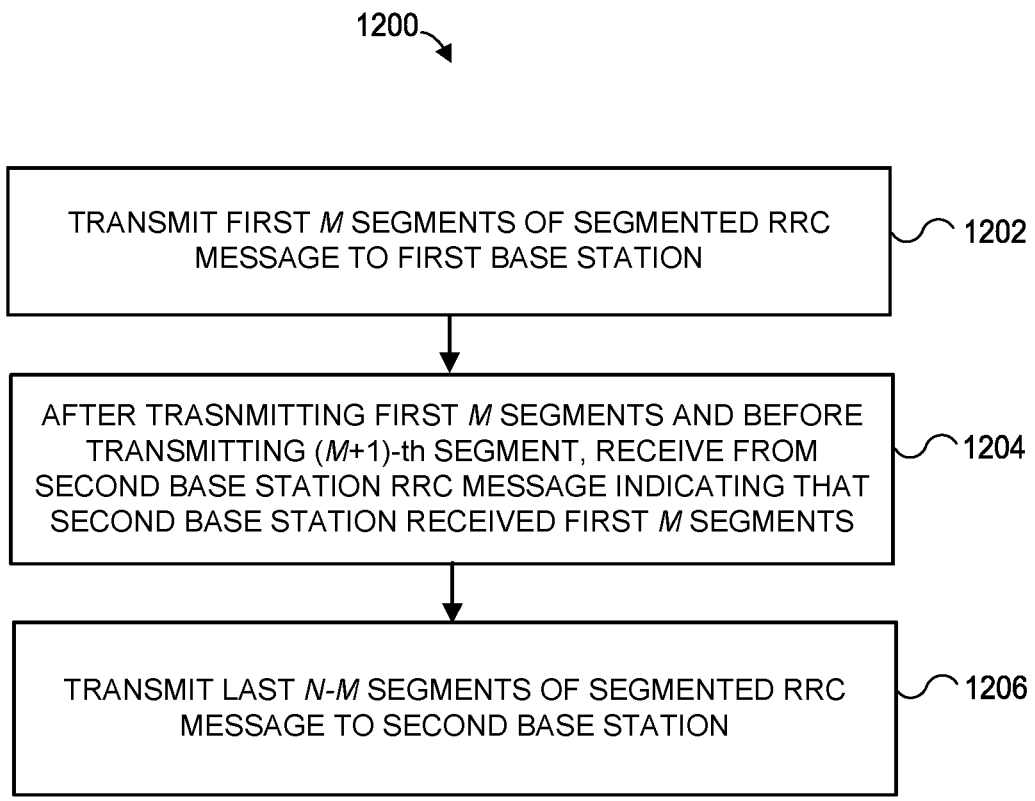

Referring now to FIG. 12, an example method 1200 for managing communication of a segmented RRC message can be implemented in a user device (e.g., by the processing hardware 120 of the UE 102) configured to communicate with a first base station (e.g., base station 104-1) and a second base station (e.g., base station 104-2). The segmented RRC message includes N segments (e.g., within N respective segments of an RRC PDU), where N is an integer greater than one, and may be a message indicating capabilities of the user device (e.g., a UECapabilityInformation message), for example. In the method 1200, the "first" base station is the originating base station in a handover procedure, and the "second" base station is the new base station in the handover procedure.

At block 1202, the user device transmits the first M segments of the segmented RRC message to the first base station (e.g., in transmissions 222-1 through 222-M of FIG. 2, or similar transmissions in starting 325 of FIG. 3).

At block 1204, after transmitting the first M segments to the first base station, the user device receives from the second base station an RRC message (e.g., a UECapabilityEnquiry message) indicating that the second base station received the first M segments. As a more specific example, the user device may receive the RRC message via the transmission 262 of FIG. 2B, or via a similar transmission in finishing 365 of FIG. 3. Prior to block 1204, the second base station may have received the first M segments from the first base station, or from a core network node, for example.

At block 1206, the user device transmits the last N-M segments of the segmented RRC message to the second base station (e.g., in transmissions 264-(M+1) through 264-N of FIG. 2B, or similar transmissions in finishing 365 of FIG. 3).

Figure 13:
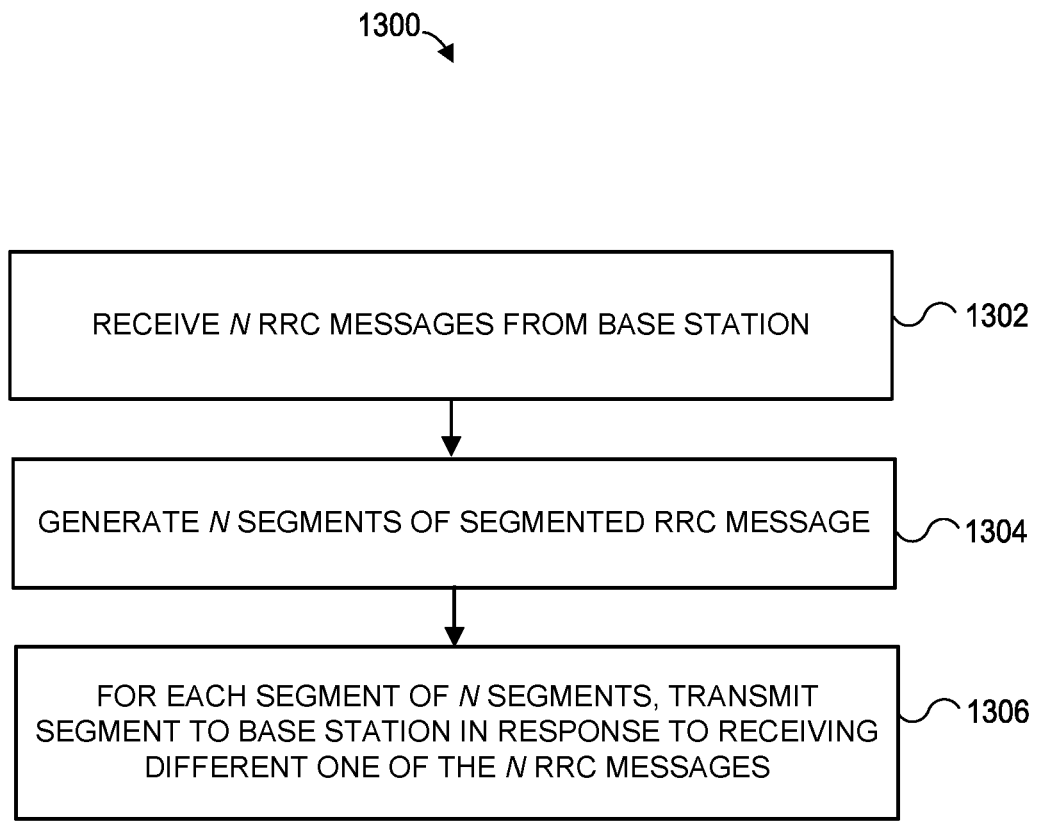

Referring now to FIG. 13, an example method 1300 for managing communication of a segmented RRC message can be implemented in a user device (e.g., by processing hardware 160 of the UE 102) configured to communicate with a base station (e.g., the base station 104-1). The segmented RRC message includes N segments (e.g., within N respective segments of an RRC PDU), where N is an integer greater than one, and may be a message indicating capabilities of the user device (e.g., a UECapabilityInformation message), for example.

At block 1302, the user device receives N RRC messages (e.g., UECapabilityEnquiry messages) from the base station (e.g., via the transmissions 804-1 through 804-N of FIG. 8). At block 1304, the user device generates the N segments of the segmented RRC message (e.g., the generating 810 of FIG. 8). At block 1306, for each segment of the N segments, the user device transmits the segment to the base station in response to receiving a different one of the N RRC messages (at block 1302) from the base station (e.g., transmissions 822-1 through 822-N). In various implementations, block 1304 may occur entirely before or entirely after block 1302, or may occur in an interleaved manner (e.g., with the user device generating and then transmitting each segment in response to receiving the respective RRC message from the base station).

Figure 14:
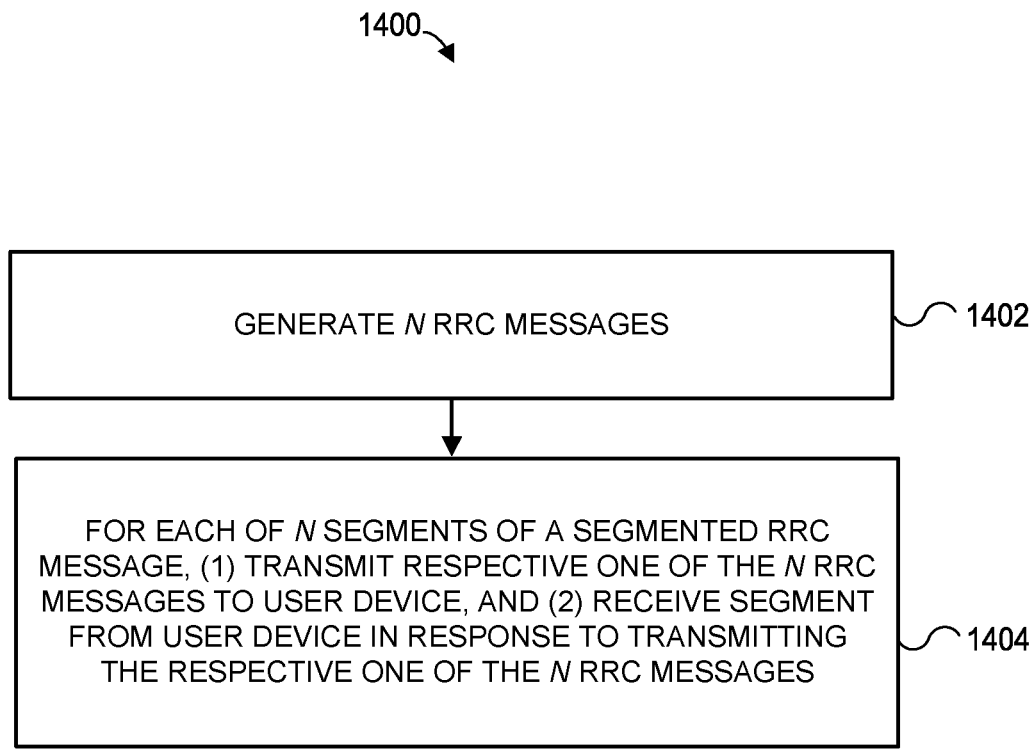

Referring now to FIG. 14, an example method 1400 for managing communication of a segmented RRC message can be implemented in a base station (e.g., by processing hardware 170 of the base station 104-1) configured to communicate with a user device (e.g., the UE 102). The segmented RRC message includes N segments (e.g., within N respective segments of an RRC PDU), where N is an integer greater than one, and may be a message indicating capabilities of the user device (e.g., a UECapabilityInformation message), for example.

At block 1402, the base station generates N RRC messages (e.g., UECapabilityEnquiry messages). At block 1404, for each of the N RRC messages, the base station transmits a respective one of the N RRC messages to the user device (e.g., in a respective one of transmissions 804-1 through 804-N), and receives a segment of the segmented RRC message from the user device in response (e.g., via a respective one of the transmissions 822-1 through 822-N). In various implementations, block 1402 may occur entirely before block 1404, or may occur in an interleaved manner (e.g., with the base station waiting to generate and transmit the X-th RRC message of the N RRC messages until the base station receives the (X-1)-th segment from the user device, where $1 < X \leq N$).

By way of example, and not limitation, the disclosure herein contemplates at least the following aspects:

Aspect 1—A method, in a first base station configured to communicate with a user device, for managing communication of a segmented radio resource control (RRC) message that includes N segments, the method comprising: receiving a first M segments of the segmented RRC message from the user device, M being an integer greater than zero and less than N; determining, by processing hardware of the first base station and before receiving an (M+1)-th segment of the segmented RRC message, that one or more criteria for initiating a handover to a second base station are satisfied; and after determining that the criteria are satisfied, executing a first RRC procedure before a second RRC procedure has completed, wherein the first RRC procedure and the second RRC procedure are different ones of (i) the first base station receiving at least the (M+1)-th segment through an N-th segment of the segmented RRC message from the user device, and (ii) initiating the handover to the second base station.

Aspect 2—The method of aspect 1, wherein initiating the handover to the second base station includes (i) transmitting a handover request message to the second base station or (ii) transmitting a handover required message to a core network node.

Aspect 3—The method of aspect 1, wherein executing the first RRC procedure before the second RRC procedure has completed includes initiating the handover to the second base station before receiving at least the (M+1)-th segment through the N-th segment from the user device.

Aspect 4—The method of aspect 3, wherein initiating the handover to the second base station includes (i) transmitting a handover request message including the first M segments to the second base station or (ii) transmitting a handover required message including the first M segments to a core network node.

Aspect 5—The method of aspect 1, wherein executing the first RRC procedure before the second RRC procedure has completed includes initiating the handover to the second base station after receiving the (M+1)-th segment through the N-th segment from the user device.

Aspect 6—The method of aspect 1, wherein initiating the handover to the second base station includes transmitting to the user device an RRC message that causes the user device to stop transmitting the segmented RRC message to the first base station.

Aspect 7—The method of aspect 6, wherein the RRC message is an RRC reconfiguration message.

Aspect 8—The method of aspect 1, wherein the segmented RRC message is a message indicating capabilities of the user device.

Aspect 9—The method of aspect 1, wherein the segmented RRC message is included in a segmented RRC protocol data unit (PDU).

Aspect 10—A base station comprising processing hardware configured to execute a method according to any of one of aspects 1 through 9.

Aspect 11—A method, in a first base station configured to communicate with a user device, for managing communication of a segmented radio resource control (RRC) message that includes N segments, the method comprising: performing a handover procedure with a second base station that was previously communicating with the user device, wherein performing the handover procedure includes receiving a first M segments of the segmented RRC message from the second base station or a core network node, M being an integer greater than zero and less than N; after performing the handover procedure with the second base station, generating, by processing hardware of the first base station, an RRC message indicating that the first base station received the first M segments; and transmitting the RRC message to the user device to cause the user device to transmit a last N-M segments of the segmented RRC message to the first base station.

Aspect 12—The method of aspect 11, wherein performing the handover procedure with the second base station includes: receiving the first M segments in a handover request message from the second base station; and transmitting a handover request acknowledge message to the second base station.

Aspect 13—The method of aspect 11, wherein performing the handover procedure with the second base station includes: receiving the first M segments in a handover request message from the core network node; and transmitting a handover request acknowledge message to the core network node.

Aspect 14—The method of aspect 11, wherein the segmented RRC message is a message that is generated by the user device and indicates capabilities of the user device.

Aspect 15—The method of aspect 11, wherein the segmented RRC message is included in a segmented RRC protocol data unit (PDU).

Aspect 16—A base station comprising processing hardware configured to execute a method according to any of one of aspects 11 through 15.

Aspect 17—A method, in a core network node configured to communicate with a first base station and a second base station, for managing communication of a segmented radio resource control (RRC) message that includes N segments, the method comprising: performing a handover procedure with the first base station and the second base station, at least in part by receiving from the first base station a first message including a first M segments of the segmented RRC message, M being an integer greater than zero and less than N, generating, by processing hardware of the core network node, a second message including the first M segments, and transmitting the second message to the second base station, to cause the second base station to request a last N-M segments of the segmented RRC message from the user device.

Aspect 18—The method of aspect 17, wherein performing the handover procedure with the first base station and the second base station further includes: receiving a handover request acknowledge message from the second base station; and transmitting a handover command to the first base station.

Aspect 19—The method of aspect 17, wherein the segmented RRC message is a message that is generated by the user device and indicates capabilities of the user device.

Aspect 20—The method of aspect 17, wherein the segmented RRC message is included in a segmented RRC protocol data unit (PDU).

Aspect 21—A core network node comprising processing hardware configured to execute a method according to any of one of aspects 17 through 20.

Aspect 22—A method, in a user device configured to communicate with a first base station and a second base station, for managing communication of a segmented radio resource control (RRC) message that includes N segments, the method comprising: transmitting at least a first M segments of the segmented RRC message to the first base station, M being an integer greater than zero and less than N; after transmitting at least the first M segments, receiving from the second base station an RRC message indicating that the second base station received the first M segments; and in response to the RRC message, transmitting a last N-M segments of the segmented RRC message to the second base station.

Aspect 23—The method of aspect 22, further comprising: receiving an earlier RRC message from the first base station, wherein transmitting at least the first M segments occurs in response to receiving the earlier RRC message.

Aspect 24—The method of aspect 23, wherein: the earlier RRC message is a message requesting user device capability information; and the segmented RRC message is a message indicating capabilities of the user device.

Aspect 25—The method of aspect 22, wherein the segmented RRC message is included in a segmented RRC protocol data unit (PDU).

Aspect 26—A user device comprising processing hardware configured to execute a method according to any of one of aspects 22 through 25.

Aspect 27—A method, in a user device configured to communicate with a base station, for managing communication of a segmented radio resource control (RRC) message that includes N segments, the method comprising: receiving N RRC messages from the base station; generating, by processing hardware of the user device, the N segments; and for each segment of the N segments, transmitting the segment to the base station in response to receiving a different one of the N RRC messages.

Aspect 28—The method of aspect 27, wherein generating the N segments includes generating each segment of the N segments in response to receiving a different one of the N RRC messages from the base station.

Aspect 29—The method of aspect 27, wherein each of the N RRC messages indicates a different segment number in a range from 1 to N.

Aspect 30—The method of aspect 27, wherein: each of the N RRC messages is a message requesting user device capability information; and the segmented RRC message is a message indicating capabilities of the user device.

Aspect 31—The method of aspect 27, wherein the segmented RRC message is included in a segmented RRC protocol data unit (PDU).

Aspect 32—A user device comprising processing hardware configured to execute a method according to any of one of aspects 27 through 31.

Aspect 33—A method, in a base station configured to communicate with a user device, for managing communication of a segmented radio resource control (RRC) message that includes N segments, the method comprising: generating, by processing hardware of the base station, N RRC messages; and for each segment of the N segments, transmitting a respective one of the N RRC messages to the user device, and receiving the segment from the user device in response to transmitting the respective one of the N RRC messages.

Aspect 34—The method of aspect 33, wherein each of the N RRC messages indicates a different segment number in a range from 1 to N.

Aspect 35—The method of aspect 33, wherein: each of the N RRC messages is a message requesting user device capability information; and the segmented RRC message is a message indicating capabilities of the user device.

Aspect 36—The method of aspect 33, wherein the segmented RRC message is included in a segmented RRC protocol data unit (PDU).

Aspect 37—A user device comprising processing hardware configured to execute a method according to any of one of aspects 33 through 36.

The following additional considerations apply to the foregoing discussion.

A user device in which the techniques of this disclosure can be implemented (e.g., the UE 102) can be any suitable device capable of wireless communications such as a smartphone, a tablet computer, a laptop computer, a mobile gaming console, a point-of-sale (POS) terminal, a health monitoring device, a drone, a camera, a media-streaming dongle or another personal media device, a wearable device such as a smartwatch, a wireless hotspot, a femtocell, or a broadband router. Further, the user device in some cases may be embedded in an electronic system such as the head unit of a vehicle or an advanced driver assistance system (ADAS). Still further, the user device can operate as an internet-of-things (IoT) device or a mobile-internet device (MID). Depending on the type, the user device can include one or more general-purpose processors, a computer-readable memory, a user interface, one or more network interfaces, one or more sensors, etc.

Certain implementations are described in this disclosure as including logic or a number of components or modules. Modules may can be software modules (e.g., code stored on non-transitory machine-readable medium) or hardware modules. A hardware module is a tangible unit capable of performing certain operations and may be configured or arranged in a certain manner. A hardware module can comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. The decision to implement a hardware module in dedicated and permanently configured circuitry, or in temporarily configured circuitry (e.g., configured by software) may be driven by cost and time considerations.

When implemented in software, the techniques can be provided as part of the operating system, a library used by multiple applications, a particular software application, etc. The software can be executed by one or more general-purpose processors or one or more special-purpose processors.

Upon reading this disclosure, those of skill in the art will appreciate, through the principles disclosed herein, still additional alternative structural and functional designs for managing the communication of segmented RRC messages. Thus, while particular implementations and applications have been illustrated and described, it is to be understood that the disclosed implementations are not limited to the precise construction and components disclosed herein. Various modifications, changes and variations, which will be apparent to those of ordinary skill in the art, may be made in the arrangement, operation and details of the method and apparatus disclosed herein without departing from the spirit and scope defined in the appended claims.

What is claimed is:

1. A method, performed by a user device configured to communicate with a first base station and a second base station, for managing communication of a segmented radio resource control, RRC, message that includes N segments, the method comprising:
dividing, by an RRC layer of the user device, a first RRC message into the N segments of the segmented RRC message;
transmitting at least M segments of the segmented RRC message to the first base station, M being an integer greater than zero and less than N;
receiving from the first base station a second RRC message that configures the user device to hand over from a cell of the first base station to a cell of the second base station; and
after receiving the second RRC message, transmitting all segments of the segmented RRC message to the second base station.

2. The method of claim 1, wherein the second RRC message comprises an RRCReconfiguration message.

3. The method of claim 1, further comprising:
before receiving the second RRC message, receiving an earlier RRC message from the first base station,
wherein transmitting at least the M segments occurs in response to receiving the earlier RRC message.

4. The method of claim 1, wherein:
transmitting at least the M segments includes, for each segment of at least the M segments, transmitting a message including the segment and a segment number indicating an order of the segment in the segmented RRC message; and
transmitting all segments includes, for each segment, transmitting a message including the segment and a segment number indicating an order of the segment in the segmented RRC message.

5. The method of claim 1, wherein transmitting all segments includes transmitting a message including an N-th segment of the segmented RRC message and an indication that the message includes a last segment of the segmented RRC message.

6. The method of claim 1, further comprising:
after receiving the second RRC message from the first base station, receiving a third RRC message from the second base station,
wherein transmitting all segments of the segmented RRC message to the second base station is in response to receiving the third RRC message.

7. The method of claim 1, wherein the segmented RRC message is a message that specifies capabilities of the user device.

8. A user device comprising processing hardware and configured to:
divide, by a radio resource control, RRC, layer of the user device, a first RRC message into N segments of a segmented RRC message;
transmit at least M segments of the segmented RRC message to a first base station, M being an integer greater than zero and less than N;
receive from the first base station a second RRC message that configures the user device to hand over from a cell of the first base station to a cell of a second base station; and
after receiving the second RRC message, transmit all segments of the segmented RRC message to the second base station.

9. The user device of claim 8, wherein the second RRC message comprises an RRCReconfiguration message.

10. The user device of claim 8, wherein the user device is further configured to:
before receiving the second RRC message, receive an earlier RRC message from the first base station,
wherein transmitting at least the M segments occurs in response to receiving the earlier RRC message.

11. The user device of claim 8, wherein:
transmitting at least the M segments includes, for each segment of at least the M segments, transmitting a message including the segment and a segment number indicating an order of the segment in the segmented RRC message; and
transmitting all segments includes, for each segment, transmitting a message including the segment and a segment number indicating an order of the segment in the segmented RRC message.

12. The user device of claim 8, wherein transmitting all segments includes transmitting a message including an N-th segment of the segmented RRC message and an indication that the message includes a last segment of the segmented RRC message.

13. The user device of claim 8, wherein the user device is further configured to:
after receiving the second RRC message from the first base station, receive a third RRC message from the second base station,
wherein transmitting all segments of the segmented RRC message to the second base station is in response to receiving the third RRC message.

14. The user device of claim 8, wherein the segmented RRC message is a message that specifies capabilities of the user device.

15. A method, performed by a first base station configured to communicate with a user device, for managing communication of a segmented radio resource control, RRC, message that includes N segments, wherein the segmented RRC message comprises an RRC message that has been divided into the N segments by an RRC layer of the user device, the method comprising:
receiving M segments of the segmented RRC message from the user device, M being an integer greater than zero and less than N;
determining, before receiving an (M+1)-th segment of the segmented RRC message, that one or more criteria for initiating a handover to a second base station are satisfied;
after determining that the criteria are satisfied, receiving at least the (M+1)-th to N-th segments of the segmented RRC message from the user device; and
after receiving at least the (M+1)-th to N-th segments of the segmented RRC message from the user device, initiating the handover to the second base station.

16. The method of claim 15, wherein initiating the handover to the second base station includes (i) transmitting a handover request message to the second base station or (ii) transmitting a handover request message to a core network node.

17. The method of claim 15, wherein the segmented RRC message is a message indicating capabilities of the user device.

18. The method of claim 15, wherein:
receiving the M segments includes, for each segment of the M segments, receiving a message including the segment and a segment number indicating an order of the segment in the segmented RRC message; and
receiving at least the (M+1)-th to N-th segments includes, for each segment of at least the (M+1)-th to (N−1)-th segments, receiving a message including the segment and a segment number indicating an order of the segment in the segmented RRC message.

19. The method of claim 15, wherein:
receiving the N-th segment includes receiving a message including the N-th segment and an indication that the message includes a last segment of the segmented RRC message.

20. A base station comprising processing hardware and configured to:
receive M segments of a segmented radio resource control, RRC, message from a user device, the segmented RRC message including N segments, and M being an integer greater than zero and less than N;
determine, before receiving an (M+1)-th segment of the segmented RRC message, that one or more criteria for initiating a handover to a second base station are satisfied;
after determining that the criteria are satisfied, receive at least the (M+1)-th to N-th segments of the segmented RRC message from the user device; and
after receiving at least the (M+1)-th to N-th segments of the segmented RRC message from the user device, initiate the handover to the second base station.

21. The base station of claim 20, wherein initiating the handover to the second base station includes (i) transmitting a handover request message to the second base station or (ii) transmitting a handover request message to a core network node.

22. The base station of claim 20, wherein the segmented RRC message is a message indicating capabilities of the user device.

23. The base station of claim 20, wherein:

receiving the M segments includes, for each segment of the M segments, receiving a message including the segment and a segment number indicating an order of the segment in the segmented RRC message; and receiving at least the (M+1)-th to N-th segments includes, for each segment of at least the (M+1)-th to (N−1)-th segments, receiving a message including the segment and a segment number indicating an order of the segment in the segmented RRC message.

24. The base station of claim 20, wherein:

receiving the N-th segment includes receiving a message including the N-th segment and an indication that the message includes a last segment of the segmented RRC message.

* * * * *